US009647288B2

(12) United States Patent
Angell et al.

(10) Patent No.: US 9,647,288 B2
(45) Date of Patent: May 9, 2017

(54) PHOSPHORIC ACID-BASED ELECTROLYTES AND APPLICATIONS THEREOF

(71) Applicants: C. Austen Angell, Mesa, AZ (US); Younes Ansari, Medford, MA (US); Telpriore Greg Tucker, Phoenix, AZ (US)

(72) Inventors: C. Austen Angell, Mesa, AZ (US); Younes Ansari, Medford, MA (US); Telpriore Greg Tucker, Phoenix, AZ (US)

(73) Assignee: ARIZONA BOARD OF REGENTS, A BODY CORPORATE OF THE STATE OF ARIZONA ACTING FOR AND ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 282 days.

(21) Appl. No.: 14/621,707

(22) Filed: Feb. 13, 2015

(65) Prior Publication Data
US 2015/0270568 A1 Sep. 24, 2015

Related U.S. Application Data

(63) Continuation-in-part of application No. PCT/US2013/055453, filed on Aug. 16, 2013.
(Continued)

(51) Int. Cl.
H01M 8/10 (2016.01)
H01M 8/02 (2016.01)
(Continued)

(52) U.S. Cl.
CPC ............ *H01M 8/1016* (2013.01); *H01B 1/06* (2013.01); *H01M 8/0289* (2013.01);
(Continued)

(58) Field of Classification Search
CPC ............ H01M 8/1016; H01M 8/0289; H01M 2300/0085; H01M 8/1048;
(Continued)

(56) References Cited

U.S. PATENT DOCUMENTS 5,219,675 A 6/1993 Kamide et al.
6,307,732 B1 10/2001 Tsubaki et al.
(Continued)

OTHER PUBLICATIONS

PCT Officer Tai Hyun Kang, International Search Report and Written Opinion of International Application No. PCT/US2013/055453, mailed Nov. 18, 2013, 14 pp.
(Continued)

Primary Examiner — Stewart Fraser
(74) Attorney, Agent, or Firm — Fish & Richardson P.C.

(57) ABSTRACT

A liquid electrolyte formed by reacting phosphoric acid ($H_3PO_4$) in the liquid state with silicon tetrachloride ($SiCl_4$), thereby forming a fluid suspension. The fluid suspension is heated to yield a liquid electrolyte including phosphoric acid ($H_3PO_4$), pyrophosphoric acid ($H_4P_2O_7$), and a particulate solid comprising a silicophosphoric acid, wherein the silicophosphoric acid is an acidic molecular compound including silicon and phosphorus. A concentrated silicophosphoric acid composition prepared by removing most of the liquid from the liquid electrolyte is dissolved in water to yield a homogeneous solution. The homogeneous solution is dried to yield a solid electrolyte. In some cases, the homogenous solution is dried on a substrate to coat at least a portion of the substrate with a proton conductive solid electrolyte. A
(Continued)

fuel cell may include the liquid electrolyte, the solid electrolyte, or the coated substrate.

19 Claims, 18 Drawing Sheets

Related U.S. Application Data

(60) Provisional application No. 62/014,195, filed on Jun. 19, 2014, provisional application No. 61/684,092, filed on Aug. 16, 2012, provisional application No. 61/778,823, filed on Mar. 13, 2013.

(51) Int. Cl.
*H01M 8/1016* (2016.01)
*H01B 1/06* (2006.01)
*H01M 8/0289* (2016.01)
*H01M 8/1048* (2016.01)

(52) U.S. Cl.
CPC .. *H01M 8/1048* (2013.01); *H01M 2300/0068* (2013.01); *H01M 2300/0085* (2013.01); *H01M 2300/0091* (2013.01)

(58) Field of Classification Search
CPC .. H01M 2300/0068; H01M 2300/0091; H01B 1/06; Y02E 60/521
See application file for complete search history.

(56) References Cited

U.S. PATENT DOCUMENTS

| | | | |
|---|---|---|---|
| 2007/0015022 A1 | 1/2007 | Chang et al. | |
| 2008/0209876 A1* | 9/2008 | Miller | G11C 13/0009 55/522 |
| 2011/0217623 A1* | 9/2011 | Jiang | H01M 8/1016 429/495 |

OTHER PUBLICATIONS

Jongwon Lee et al., "Phosphoric Acid-Functionalized Mesoporous Silica/Nafion Composite Membrane for High Temperature PEMFCs", Bulletin of the Korean Chemical Society (BKCS), Apr. 20, 2012, vol. 33, No. 4, pp. 1397-1400.

\* cited by examiner

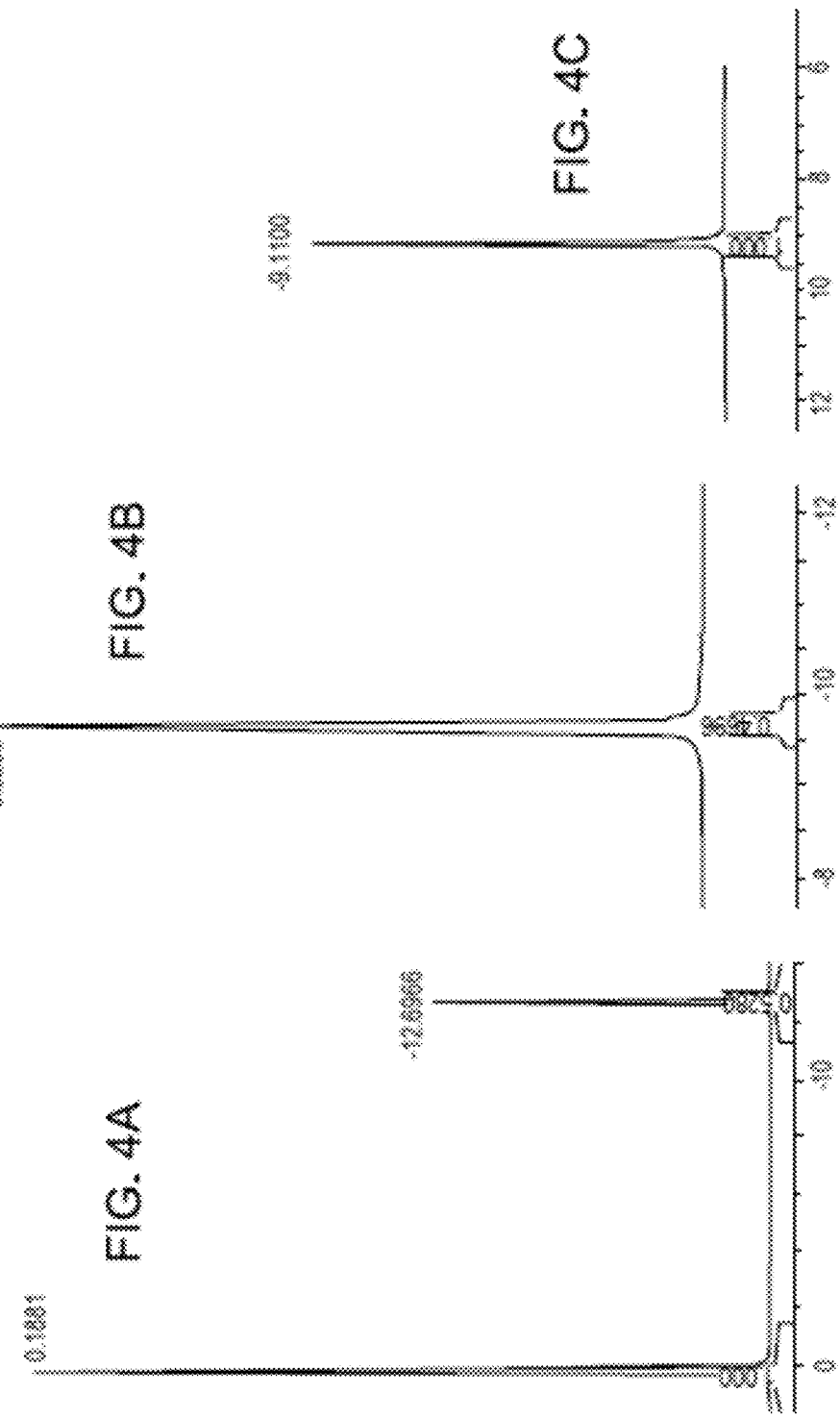

PHOSPHORIC ACID-BASED ELECTROLYTES AND APPLICATIONS THEREOF

CROSS-REFERENCE TO RELATED APPLICATIONS

This application claims priority to U.S. App. Ser. No. 62/014,194 entitled "A FLEXIBLE PHOSPHORIC ACID SILICA POLYMER GEL WITH CONDUCTIVITY ABOVE NAFION, FOR FUEL CELL (PEMFC) OPERATION TO 150° C." and filed on Jun. 19, 2014 and is a continuation-in-part of PCT App. No. PCT/US2013/055453 entitled "PHOSPHORIC ACID-BASED ELECTROLYTES AND APPLICATIONS THEREOF" and filed on Aug. 16, 2013, which claims priority to U.S. App. Ser. No. 61/684,092 entitled "ANHYDROUS PHOSPHORIC ACID DERIVATIVES" and filed on Aug. 16, 2012 and U.S. App. Ser. No. 61/778,823, entitled "ANHYDROUS PHOSPHORIC ACID DERIVATIVES" and filed on Mar. 13, 2013, all of which are incorporated by reference herein in their entirety.

STATEMENT OF GOVERNMENT INTEREST

This work was supported by the Department of Defense Army Research under Grant Nos. W911NF-07-G-0423 and W911NF-04-1-0060. The government has certain rights in the invention.

TECHNICAL FIELD

This invention relates to phosphoric acid-based electrolytes and applications thereof, including fuel cells having phosphoric acid-based electrolytes.

BACKGROUND

The phosphoric acid fuel cell is known as one of most researched, and commercially most advanced types of fuel cell. An advantage it holds over NAFION-based fuel cells is the higher temperature range of operation permitted by the electrolyte. Electrolytes in phosphoric acid fuel cells have been used up to 160° C. before water loss, to form pyrophosphoric acid, leads to reduced conductivity and poorer performance.

Proton exchange membrane fuel cells (PEMFCs) are under intense development as non-polluting power sources that in principle are the most efficient means of converting chemical energy to electrical energy and mechanical work. However, practical realization of this efficiency, even in the simple $H_2/O_2$ fuel cell case, proves to be fraught with difficulties. NAFION fuel cells, based on sulfonated polytetrafluoro-ethylene proton conductive membranes, are favored for their high conductivities, but are limited to temperatures below 100° C. because of loss, at higher temperatures, of the water needed for high conductivity—which means the fuel cell is susceptible to catalyst poisoning by CO gas impurities. The NAFION-based cells also suffer from acute water crossover, hence water management, problems.

Attempts have been made to increase the operating temperature of the NAFION membrane cell by various methods. However, NAFION and other perfluorinated polymer electrolytes (i.e. FLEMION, and ACIPLEX) are limited in commercial applications because of the high materials costs, coupled with the reduced performance at high temperatures.

SUMMARY

In a first general aspect, preparing an electrolyte includes reacting phosphoric acid ($H_3PO_4$) in the liquid state with silicon tetrachloride ($SiCl_4$), thereby forming a fluid suspension. The fluid suspension is heated to yield a liquid electrolyte including phosphoric acid ($H_3PO_4$), pyrophosphoric acid ($H_4P_2O_7$), and a particulate solid comprising a silicophosphoric acid, wherein the silicophosphoric acid is an acidic molecular compound including silicon and phosphorus.

A second general aspect includes a liquid electrolyte formed by the first general aspect.

In a third general aspect, a liquid electrolyte includes phosphoric acid ($H_3PO_4$); pyrophosphoric acid ($H_4P_2O_7$); and a particulate solid comprising a silicophosphoric acid, wherein the silicophosphoric acid is an acidic molecular compound including silicon and phosphorus.

A fourth general aspect includes a solid electrolyte formed by dissolving a composition in water to yield a homogenous solution, and drying the homogenous solution to yield the solid electrolyte. The composition is prepared by removing most of the liquid from a fluid suspension including phosphoric acid ($H_3PO_4$), pyrophosphoric acid ($H_4P_2O_7$), and a particulate solid comprising a silicophosphoric acid, wherein the silicophosphoric acid is an acidic molecular compound including silicon and phosphorus.

A fifth general aspect includes a proton conductive membrane formed by dissolving a composition in water to yield a homogenous solution, contacting a substrate with the homogeneous solution, and drying the homogenous solution to coat at least a portion of the substrate with a solid electrolyte. The composition is prepared by removing most of the liquid from a fluid suspension including phosphoric acid ($H_3PO_4$); pyrophosphoric acid ($H_4P_2O_7$); and a particulate solid comprising a silicophosphoric acid, wherein the silicophosphoric acid is an acidic molecular compound comprising silicon and phosphorus.

A sixth general aspect includes the liquid electrolyte formed as in the first general aspect.

Implementations of any of the first to sixth aspects may independently include one or more of the following features as applicable.

In some cases, the fluid suspension is creamy in appearance. The fluid suspension may scatter incident visible light. The phosphoric acid may be anhydrous phosphoric acid. In certain cases, the phosphoric acid is formed from pure anhydrous phosphoric acid in the solid state.

Heating the fluid suspension may include heating the fluid suspension to a temperature sufficient to yield a molar ratio of pyrophosphoric acid to phosphoric acid in the range between 0.1:1 and 0.8:1 or 0.3 and 0.7. This ratio may be assessed, for example, with $^{31}P$ NMR spectroscopy. In some cases, the temperature sufficient to yield a molar ratio of pyrophosphoric acid to phosphoric acid in the range between 0.1:1 and 0.8:1 is least 100° C., at least 200° C., or at least 250° C. In certain cases, the molar ratio of pyrophosphoric acid to phosphoric acid is in a range between 0.1:1 and 0.8:1. The particulate solid may include two or more different silicophosphoric acids.

In some cases, the silicophosphoric acid has a ratio of silicon to phosphorus in the range between 1:2 and 1:4. The silicophosphoric acid may include a four-coordinate silicon atom. In one example, the silicophosphoric acid has a chemical formula or empirical formula comprising $SiP_2O_8H_2$. For instance, the silicophosphoric acid may have the chemical formula $SiP_2O_8H_2 \cdot (H_3PO_4)_2$. A silicophosphoric acid having the empirical formula $SiP_2O_8H_2$ may include a chemical structure depicted by the following arrangement of atoms:

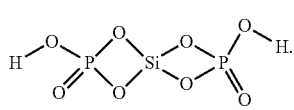

(1)

In certain cases, the silicophosphoric acid includes a six-coordinate silicon atom. A silicophosphoric acid including a six-coordinate silicon atom may include a chemical structure depicted by the following arrangement of atoms:

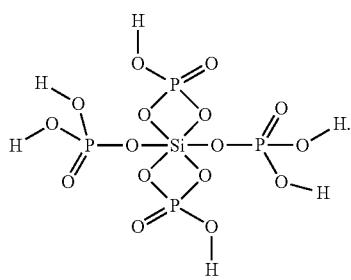

(2)

The liquid electrolyte may be chemically unchanged after heating for 24 hours at a temperature up to 250° C. The conductivity of the liquid electrolyte may exceed 300 mS/cm at 200° C.

In some implementations, the silicophosphoric acid is separated from the liquid electrolyte to yield a more concentrated composition including the silicophosphoric acid. Separating the silicophosphoric acid from the liquid electrolyte may include, for example, centrifuging the liquid electrolyte. The composition may be in the form of a paste at room temperature. In some cases, the paste includes residual phosphoric acid, pyrophosphoric acid, or a combination thereof. The composition is typically soluble in water. In certain cases, the composition is combined with water to yield a homogeneous solution.

A substrate may be contacted with the homogenous solution. The substrate may be porous. Examples of porous substrates include a mesh, a screen, or a network of fibers. The substrate may include metal, glass, polymer, paper, or a combination thereof. After contacting the substrate with the homogeneous solution, the homogeneous solution in contact with the substrate may be solidified to coat at least a portion of the substrate with a solid electrolyte. The solid electrolyte is typically a rubbery solid. The coated substrate is generally proton conductive. In some cases, the coated substrate is a proton conductive membrane.

In certain implementations, the homogeneous solution is treated to yield a gel. Treating the homogeneous solution may include, for example, removing water from the homogenous solution. The gel may be dried to yield a solid electrolyte. The electrolyte is typically rubbery. In some cases, the solid electrolyte is chemically stable up to 150° C. The conductivity of the solid electrolyte may exceed 200 mS/cm at 100° C.

The solid electrolyte may include phosphoric acid and a silicate or silicophosphate network. The phosphoric acid may be, for example, within the silicate or silicophosphate network. The silicate or silicophosphate network includes a 4-coordinate silicon.

A seventh general aspect includes a solid electrolyte comprising silicon and phosphorus. The conductivity of the solid electrolyte at ambient temperature and humidity exceeds that of NAFION 115, and the conductivity of the electrolyte at 80° C. exceeds that of NAFION 115 in its 100% humidified form under 3.5 atmospheres of pressure.

An eighth general aspect and implementations thereof includes a fuel cell including a liquid electrolyte, a solid electrolyte, or a proton conductive membrane as described in any of the first through seventh general aspects, with implementations independently including one or more of the features described with respect to the first through seventh general aspects as applicable.

Further implementations of the eighth general aspect may independently include one or more of the following features.

In one example, the fuel cell operates above 200° C. or up to 250° C. The fuel cell may achieve a power density of 184 $mWcm^{-2}$ at 226° C. with hydrogen flow rate of 4.1 mL/min.

These general and specific aspects may be implemented using a device, system or method, or any combination of devices, systems, or methods. The details of one or more embodiments are set forth in the accompanying drawings and the description below. Other features, objects, and advantages will be apparent from the description and drawings, and from the claims.

BRIEF DESCRIPTION OF THE DRAWINGS

FIG. 4A shows a $^{31}P$ NMR spectrum of SiPOH in phosphoric acid. FIG. 4B shows a $^{31}P$ NMR spectrum of a portion of the sample of FIG. 4A dissolved in $D_2O$. FIG. 4C shows a proton NMR spectrum of SiPOH in phosphoric acid.

DETAILED DESCRIPTION

Figure 1:
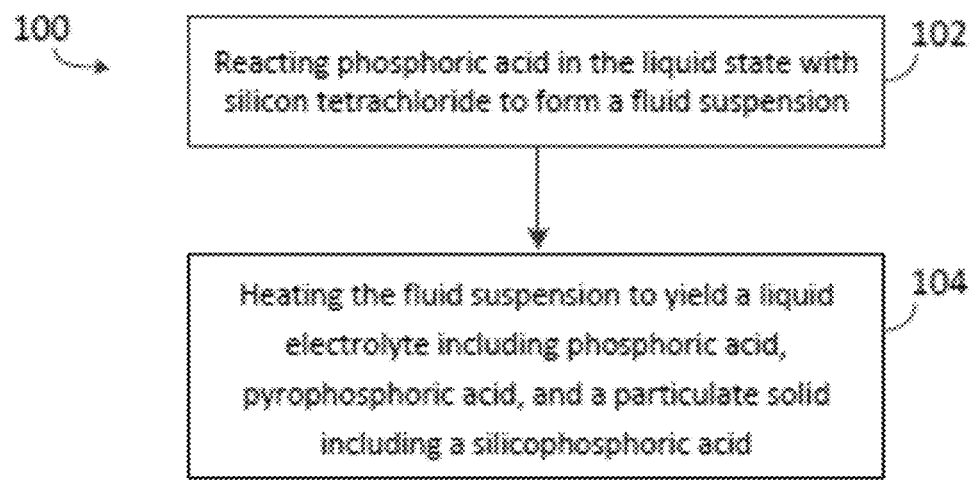
FIG. 1 shows a process for forming a liquid inorganic electrolyte including a silicophosphoric acids (SiPOH).

As described herein, phosphoric acid ($H_3PO_4$) in the liquid state and silicon tetrachloride ($SiCl_4$) and are reacted to yield a fluid suspension, and the fluid suspension is heated to yield a liquid electrolyte including phosphoric acid, pyrophosphoric acid, and a particulate solid including a silicophosphoric acid. As used herein, a "silicophosphoric acid" is an acidic molecular inorganic compound including silicon and phosphorus. "SiPOH" is used herein to refer to a silicophosphoric acid or a mixture of two or more silicophosphoric acids, each having a different chemical formula. SiPOH dissolves in water to form a clear, homogenous aqueous solution. Upon standing, the homogenous solution forms a gel, and the gel is dried to form a solid electrolyte referred to herein as "SiPOly." The solid inorganic electrolyte is has an elastic or "rubbery" properties and is typically flexible and deformable.

The fluid suspension, or SiPOH-stabilized phosphoric acid electrolyte, can be used as a liquid inorganic electrolyte for hydrogen/oxygen fuel cells. This liquid inorganic electrolyte demonstrates superior behavior to phosphoric acid in both open circuit voltage (OCV) and in current delivery, the efficiency of utilization of the gaseous fuel being particularly unexpected. This liquid electrolyte has an extended stability range, remaining substantially unchanged in properties as monitored by sensitive electrical conductivity criteria over 24 hours at 250° C., far above the operating range of the standard phosphoric acid even when moderately pressurized, showing higher proton decoupling, higher thermal stability, and higher conductivity than anhydrous phosphoric acid. This liquid electrolyte extends the temperature range of fuel cell operation to temperatures where catalyst poisoning by such agents as CO and other platinum binders is no longer a factor. The efficiency of gas utilization, giving nearly 100% current efficiency, is notable. Thus, this electrolyte is suitable for use in fuel cells, either as a liquid electrolyte or, with further processing to SiPOly, as a solid electrolyte having a conductivity at ambient temperature and humidity exceeding that of NAFION 115 in its optimized form, and at 80° C. exceeding that of NAFION 115 in its 100% humidified form under 3.5 atmospheres of pressure.

Electrolytes described herein showed increased temperature range without sacrifice of high temperature conductivity or open circuit voltage. This is achieved by introduction of the SiPOH, which inhibits decomposition or water loss to 250° C., thus extending the temperature range of the phosphoric acid fuel cell to 250° C. Conductivity data to 285° C. and full $H_2/O_2$ cell polarization curves to 226° C. have been obtained. High current efficiency (current density per unit of fuel supplied per sec) is observed, and a power density of 184 mWcm$^{-2}$ is achieved at 226° C. with hydrogen flow rate of 4.1 mL/min.

The electrolytes described herein extend the temperature range of the phosphoric acid fuel cell to 250° C., while improving its operating fuel efficiency. The current efficiency ($i/i_{theoretical}$, i=current) obtained with these electrolytes is believed to be higher than that reported to date for any other type of fuel cell operating at 1 atm pressure. Its voltage efficiency is also believed to be comparable to or better than that of known phosphoric acid-based fuel cells.

FIG. 1 shows process 100 for preparing a phosphoric acid-based liquid electrolyte. In 102, phosphoric acid ($H_3PO_4$) in the liquid state is reacted with silicon tetrachloride ($SiCl_4$), thereby forming hydrochloric acid (HCl) gas and a fluid suspension including one or more silicophosphoric acids (SiPOH) in $H_3PO_4$. The fluid suspension is creamy in appearance, and scatters incident visible light. Typically, the phosphoric acted reacted with the silicon tetrachloride is anhydrous phosphoric acid. The anhydrous phosphoric acid may be formed, for example, by fusion of pure ($\geq 99\%$) phosphoric acid in the solid state. In 102, the relative amount of reactants is selected to yield a liquid saturated with SiPOH. The reactants and resulting suspension may be heated (e.g., to a temperature less than 50° C. or less than 60° C.).

In 104, the fluid suspension is heated to yield a liquid electrolyte including phosphoric acid, pyrophosphoric acid ($H_4P_2O_7$), and a particulate solid including a silicophosphoric acid. In some cases, the suspension is heated to a temperature of at least 100° C., at least 200° C., or at least 250° C. In certain cases, the suspension is heated to a temperature sufficient to yield a molar ratio of pyrophosphoric acid to phosphoric acid in the liquid electrolyte in the range between 0.1:1 and 0.8:1, or between 0.3:1 and 0.7:1. The liquid electrolyte is a stronger acid than phosphoric acid, and can serve as a liquid electrolyte for a fuel cell without further refinement. The $H_3PO_4$-insoluble components in the suspension can be increased in quantity, for example, by extended reaction times, using excess $SiCl_4$ and additional heating. The fluid suspension is a stable fluid suspension.

The silicophosphoric acid is an acidic molecular compound including silicon and phosphorus. The silicophosphoric acid typically includes oxygen and hydrogen. Heating the suspension also removes most, all, or substantially all (e.g., $\geq 99\%$) of the chlorine from unreacted silicon tetrachloride, generating hydrochloric acid gas. The liquid phosphoric acid-based electrolyte is a water-soluble suspension of SiPOH in a mixture of phosphoric acid and pyrophosphoric acid, and has a creamy white appearance. According to $^{31}P$ NMR spectroscopic analysis of one liquid electrolyte sample, the phosphorus content of the phosphoric acid/pyrophosphoric acid mixture is split approximately 2:1 between phosphoric acid and pyrophosphoric acid. In some cases, the molar ratio of pyrophosphoric acid to phosphoric acid is in the range between 0.3:1 and 0.7:1, or between 0.1:1 and 0.8:1.

SiPOH formed in process 100 may have a ratio of silicon to phosphorus in the range between 1.2 and 1:4. In some cases, SiPOH includes a silicophosphoric acid having a four coordinate silicon atom. Such a silicophosphoric acid may have an empirical formula of $SiP_2O_8H_2$, or a chemical formula including $SiP_2O_8H_2$. In one example, a silicophosphoric acid has the chemical formula $SiP_2O_8H_2 \cdot (H_3PO_4)_2$. In another example, a silicophosphoric acid may have or include a chemical structure depicted by the following arrangement of atoms:

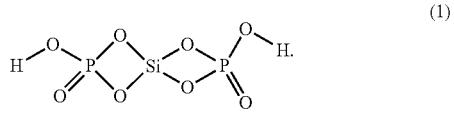

(1)

In some cases, SiPOH includes a silicophosphoric acid having a six-coordinate silicon atom. In one example, a silicophosphoric acid may have or include a chemical structure depicted by the following arrangement of atoms:

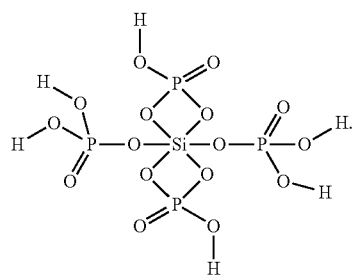

(2)

In one implementation of process 100, a liquid electrolyte is prepared by reacting $SiCl_4$ with anhydrous phosphoric acid obtained by fusion of the dry crystalline form ($T_m$=42° C.). The reaction is carried out under mild conditions, under gentle flow of nitrogen gas, initially 45° C. ($T_b$ of $SiCl_4$ is 57° C.) and continuing with gradually rising temperature (reaching 100° C.) for three hours until the liquid is saturated with reaction products (becoming creamy in color due to a fine precipitate of SiPOH), followed by gradually increasing temperature to 270° C. over one hour that establishes a content of $H_4P_2O_7$ in the liquid electrolyte.

SiPOH can be separated from the liquid electrolyte formed in 104 by methods such as: (i) centrifugation to yield a paste of solid with some excess solution or, (ii) by an (exothermic) acetone extraction process which dissolves the excess $H_3PO_4$, but not the SiPOH. Both yield the X-ray diffraction pattern shown in FIG. 2. In contrast, when ethanol is added to the centrifugation product and the temperature is raised (e.g., to 80° C.) to expel the volatiles, $SiP_2O_7$, a white crystalline solid of known structure, insoluble in water, is formed.

In another implementation of the process shown in FIG. 1, the liberated HCl can be collected in an internal chemical trap. The reaction is performed in a "closed system" comprised of a 3-neck Schlenk reaction flask. One of the joints contains a cold finger kept at about −20° C. and the other attaches to a tube containing an HCl trap. In some embodiments, the HCl trap can be a liquid mixture of two amine/aluminum chloride adducts. In some embodiments, the HCl trap is a liquid mixture of: diethylmethylamine/aluminum chloride and 2-methylpyridine/aluminum chloride. In some embodiments, the ratio of diethylmethylamine/aluminum chloride and 2-methylpyridine/aluminum chloride is about 7:3 by weight. Phosphoric acid and silicon tetrachloride are added to the Schlenk flask under nitrogen atmosphere, in a ratio of 7:3 by weight. The mixture is kept at 50° C. for 2 h. The phosphoric acid melts completely with bubbles evolving continuously. The temperature is slowly increased to 120° C. for 4 h. The final product is a white suspension, comprising SiPOH (white solid) and excess phosphoric acid. The excess phosphoric acid can be separated by centrifugation, and the remaining solid can be washed several times with a solvent that is insert with respect to SiPOH. In some embodiments, the solvent is pentafluoropropanol.

Figure 2:
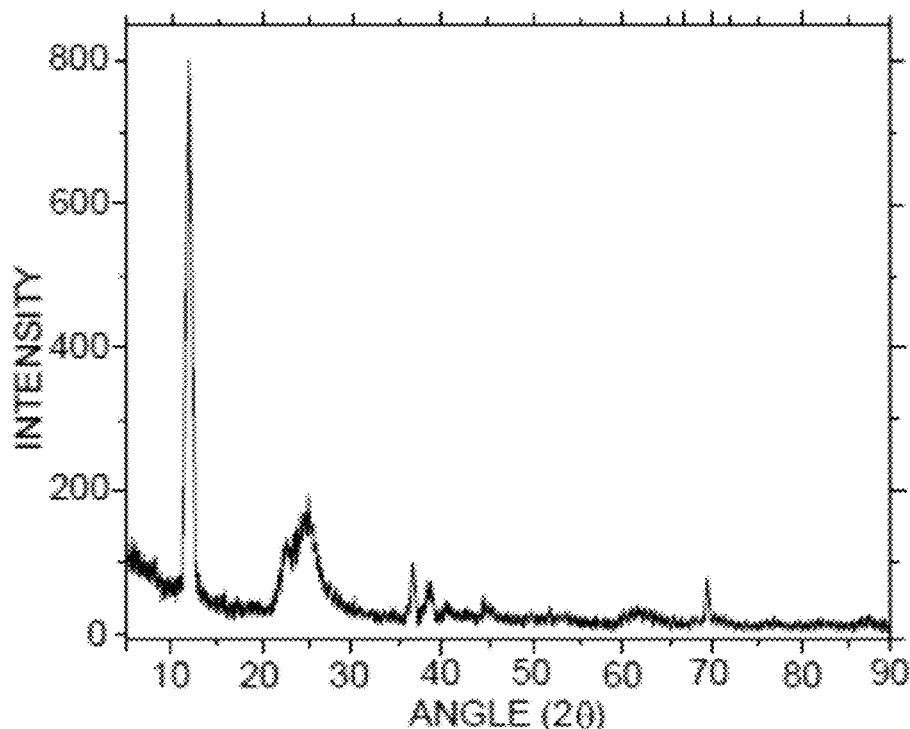
FIG. 2 shows an X-ray powder pattern of SiPOH.
Figure 3A:
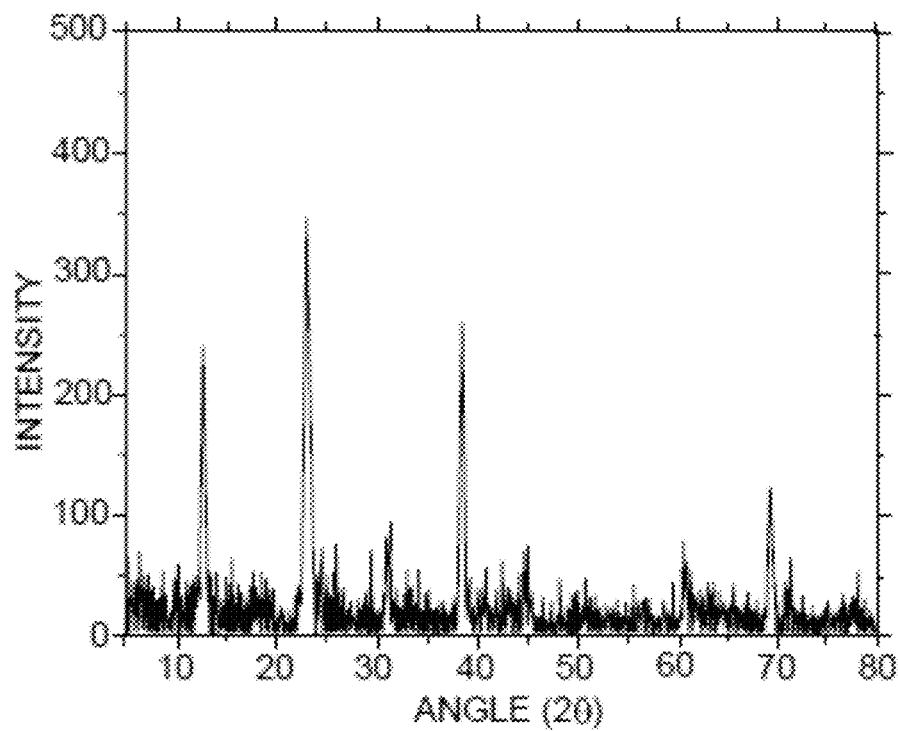
FIGS. 3A and 3B show X-ray powder patterns of the thermal decomposition product of SiPOH.
Figure 3B:
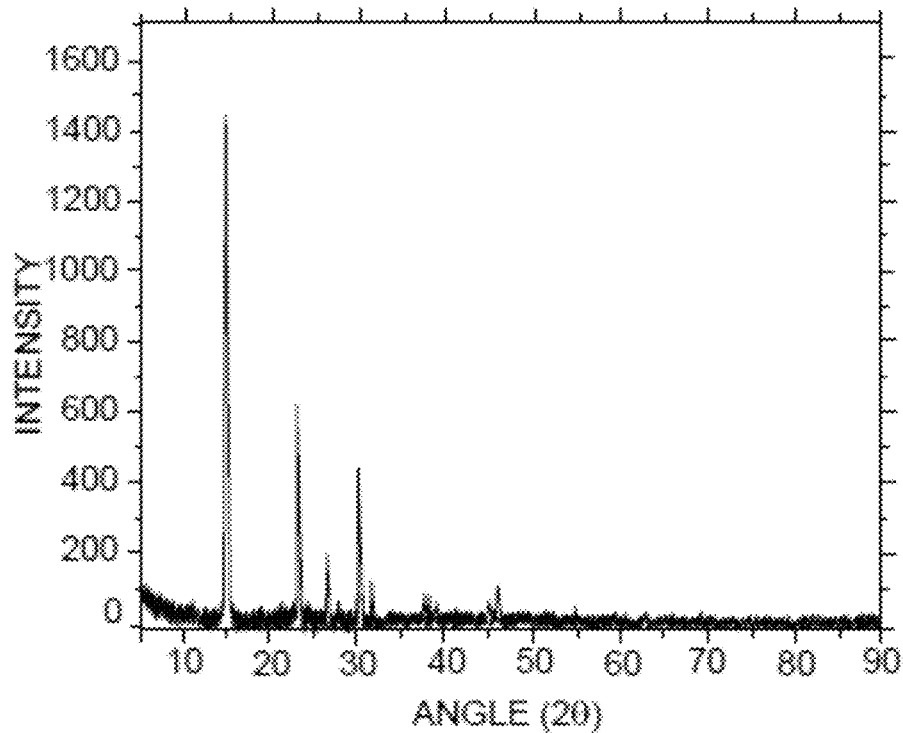

Water-soluble, light-scattering material isolated as a white powder by the acetone extraction (SiPOH) was analyzed by inductively coupled plasma (ICP) chemical analysis technique (Optical Emission Spectrometer-Themo iCAP6300), with stock standards including a 998 ppm single element silicon solution and a 100 ppm solution of $KH_2PO_4$. FIG. 2 shows an X-ray diffraction pattern of the powder obtained using a high resolution X-ray diffractometer (PANALYTICAL X'PERT PRO). The powder is stable on heating to 285° C. but then decomposes, losing about one mole of water per mole of SiPOH as described herein. The X-ray powder patterns of the product heated to 310° C. and 650° C. are shown in FIGS. 3A and 3B, respectively. The pattern of FIG. 3B is attributable to $SiP_2O_7$, and is believed to be that of a less stable configuration of the same compound.

The $^{31}P$ NMR spectrum of SiPOH acid was determined in two conditions. The liquid product of the reaction of equimolar quantities of $H_3PO_4$ and $SiCl_4$ (externally referenced to triphenylphosphine) was used as the first NMR sample. The spectrum of the resulting SiPOH in a phosphoric acid medium is shown in FIG. 4A and includes two resonances, one at δ=0.1881 ppm, known for phosphoric acid, and a second at δ=−12.6968 ppm, which can be identified as the resonance for pyrophosphoric acid, $H_4P_2O_7$. This peak is more intense for a sample prepared with a larger ratio of initial $SiCl_4$ to $H_3PO_4$, and heated for longer times, as might be expected for $H_4P_2O_7$. The second NMR sample was obtained by dissolving some of the latter sample in $D_2O$, to give a solution approximately one molar in $H_3PO_4$, assuming this to be the majority component. The new resonance appears at −9.6250 ppm, as shown by FIG. 4B (enlarged). This is less downfield that in the first solution, presumably in response to the change in proton activity. The corresponding peak for $H_3PO_4$ moved to from 0.1881 of FIG. 4A, to 1.7 in FIG. 4B.

The proton NMR spectrum of the same reaction product that gave the $^{31}P$ spectra of FIGS. 4A and 4B, shown in FIG. 4C, shows a single sharp peak at δ=9.1169 ppm from the external acetone-d6 reference, quite similar to, but more acidic than, that of a corresponding pure $H_3PO_4$ sample. The latter shows a single peak at δ=8.7681 ppm from the same external reference. Since SiPOH is a minority component and since the observed resonance is presumably an exchange average, it is implied that SiPOH is strongly acidic.

The 4-coordination for Si, double bridging to the phosphate group, suggests an explanation for the difference between the XRD of the initial dehydration product of SiPOH (FIG. 3A) and the pattern for the known $SiP_2O_7$ structure. The latter has six-coordinate Si, thought to require a more significant rearrangement than can be promoted at 300° C. The structure of FIG. 3B is thought to retain 4-coordinate Si with double bridges (e.g., as depicted in chemical structure (2) above).

The chemical formula $SiP_2O_8H_2$ was further tested by titration of the acid protons using standard NaOH solution. 10 ml of a solution that was 0.1 molar in SiPOH according to the assigned molecular formula was found to require a little more than the expected 20 ml of standard 0.1 molar NaOH to reach neutral according to standard strong acid indicators. The excess 5.9 ml is thought to be due to $H_3PO_4$ not fully removed from the SiPOH sample preparation. This test does not distinguish between a strong diprotic acid and a strong hexaprotic acid.

SiPOH-containing phosphoric acid liquid electrolyte formed as described with respect to FIG. 1 is chemically table for long periods of time at temperatures up to 250° C. For example, SiPOH-containing phosphoric acid liquid electrolyte remains unchanged in properties (monitored by sensitive electrical conductivity) over 24 hours at temperatures up to 250° C. Above 285° C., the SiPOH appears to precipitate solid $SiP_2O_7$ in an unknown crystal form. While its presence leads to an increase in electrolyte viscosity, its conductivity above 150° C. is superior to that of phosphoric acid, thought to be due at least in part to a superior "free" proton contribution.

Figure 5:
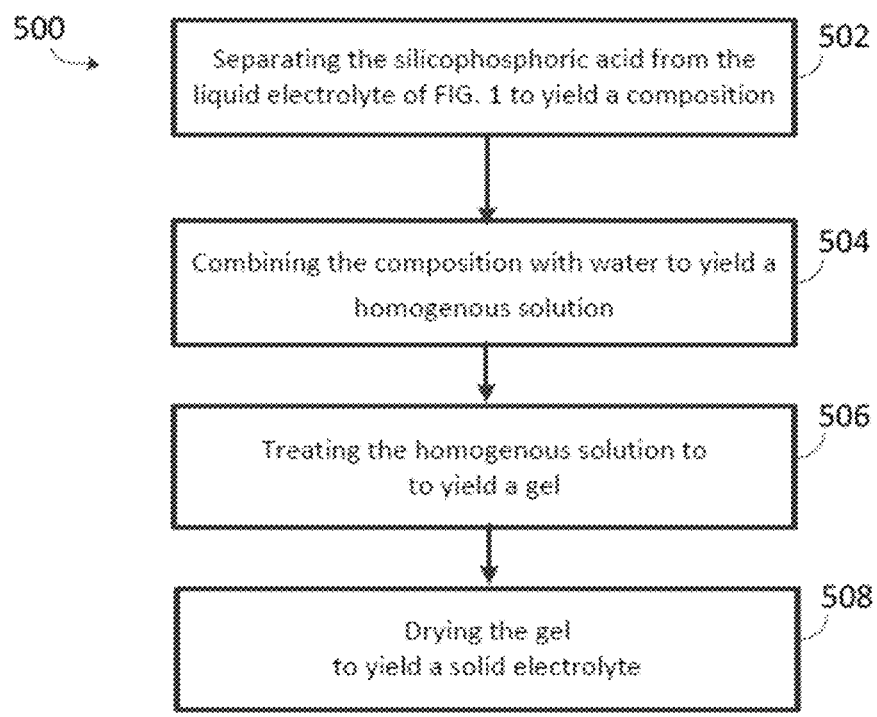
FIG. 5 shows a process for forming a solid inorganic electrolyte, referred to herein as "polysilicophosphoric acid" or "SiPOly."

FIG. 5 shows process 500 for forming a solid electrolyte from the liquid electrolyte described with respect to FIG. 1. In 502, the SiPOH is separated from the liquid electrolyte, removing liquid ($H_3PO_4$ and $H_4P_2O_7$) from the suspension to form a composition that is a concentrate of the SiPOH. The composition includes SiPOH in the form of paste. Removing the liquid to yield the SiPOH paste may be achieved, for example, by: (i) centrifugation to yield a paste of solid with some excess solution or, (ii) by an (exothermic) acetone extraction process which dissolves the excess $H_3PO_4$, but not the SiPOH. The composition may include residual $H_3PO_4$, $H_4P_2O_7$ or both.

In 504, the concentrated SiPOH composition is dissolved in water to yield a clear, homogenous solution. In 506, the homogenous solution is treated to yield a gel. Treating the homogenous solution to yield a gel includes, for example, removing water from the gel (e.g., by allowing the homogenous solution to stand for a length of time (e.g., an hour or more). In 508, removing water from the gel yields a solid electrolyte in the form of a rubbery substance, referred to herein as a "silicophosphoric acid polymer" or "SiPOly." Removing water from the gel may include drying the gel in a vacuum oven (e.g., at 40° C.).

Figure 6:
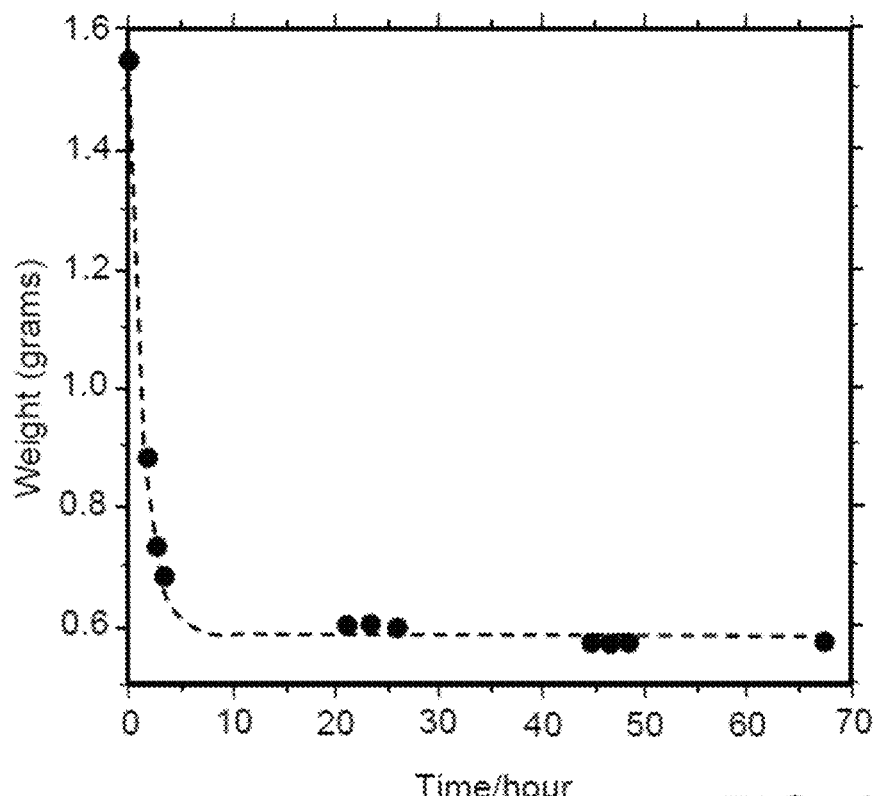
FIG. 6 shows weight loss of the gel during formation of SiPOly described with respect to FIG. 5.

In one implementation of the process shown in FIG. 5, 1.63 g of the composition obtained as in 502 is dissolved in 3.63 g of distilled water. The gel forms in about 90 min. The gel is mechanically fragile, but shrinks away from the container and strengthens into a rubbery button as water is removed by vacuum over drying at 40° C. The weight loss v. time function is shown in FIG. 6. The loss is rapid at first, but reaches a constant mass. About 90 wt % of the initial water content is lost in the drying process.

Figure 19:
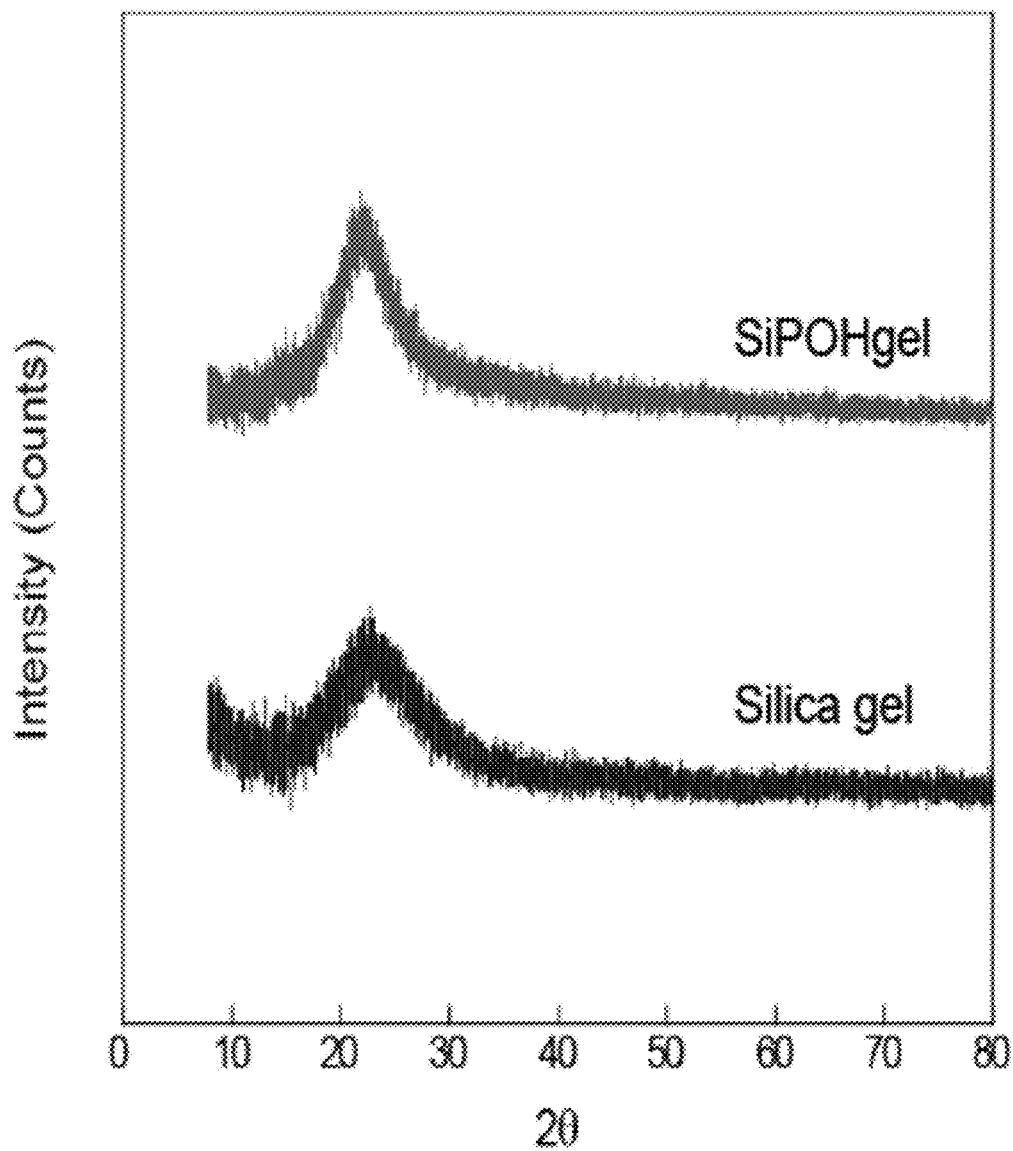
FIG. 19 shows a comparison of the XRD pattern of SiPOH gel with that of conventional anhydrous silica gel.

A comparison of the XRD pattern of SiPOH gel with that of conventional anhydrous silica gel, shown in FIG. 19, suggests that the SiPOH gel is a homogenous network of siloxy units that may be more correlated than in silica gel, yet loosely connected enough that the structure remains floppy and easily, but elastically, deformable. The spectrum suggests a dense amorphous silica network, with sufficient network defects that the structure remains flexible. Within the SiPOH gel there appears to be a uniform distribution of essentially pure phosphoric acid.

Figure 7A:
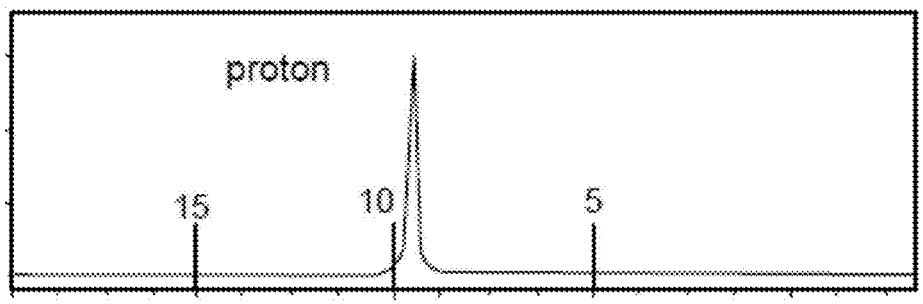
FIGS. 7A and 7B show a $^1H$ NMR spectrum and a $^{31}P$ NMR spectrum, respectively, of a gel formed as described with respect to FIG. 5.
Figure 7B:
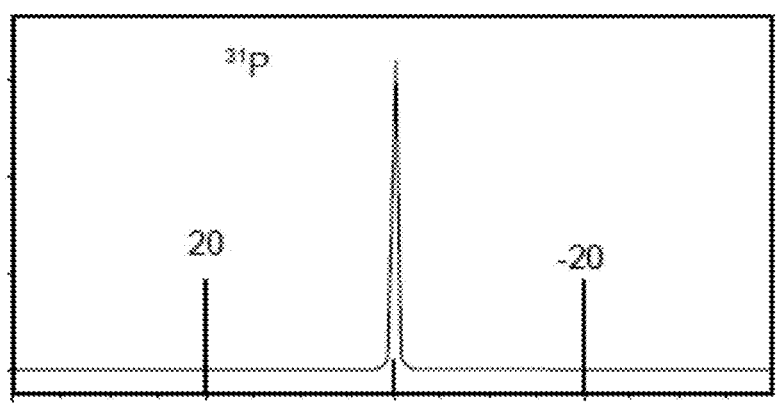
Figure 7C:
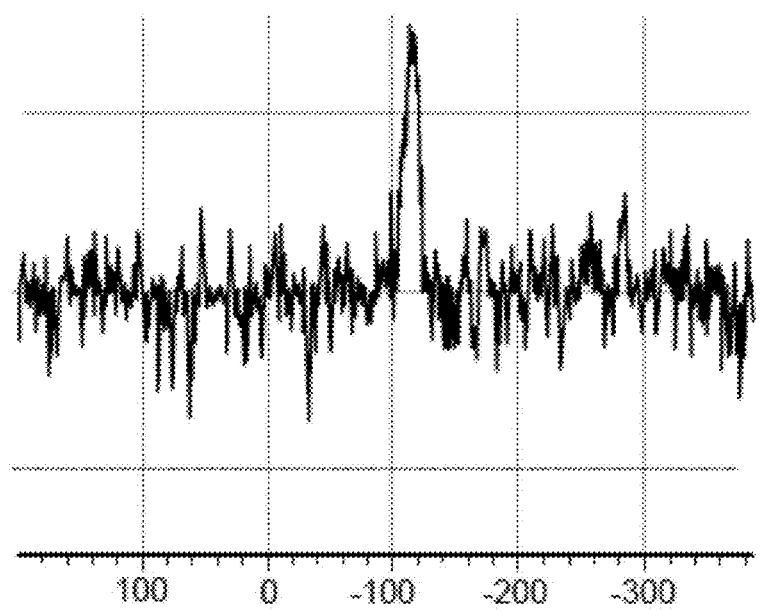
FIG. 7C shows a solid state NMR spectrum of $^{29}S$ in a gel formed as described with respect to FIG. 5.

The $^1H$ and $^{31}P$ spectra of the gel are shown in FIGS. 7A and 7B, respectively, while the silicon spectrum obtained by solid state NMR on the same gel is shown in FIG. 7C. FIGS. 7A and 7B show sharp spectral lines (resonances at 9.5 ppm relative to TMS, and at 0 relative to $H_3PO_4$) that are essentially those of phosphoric acid, suggesting that the preparation procedure has produced a phosphoric acid gel in which the supporting structure is a silicate or silicophosphate net. That this supporting structure contains silicon in a 4-coordinated state, is shown by the spectrum in FIG. 7C, where the resonance is found at −107 ppm.

FIGS. 7A and 7B suggest that the high conductivity for the "pristine SiPOly," formed as described with respect to FIG. 5, may be due to the presence of a gellified form of anhydrous $H_3PO_4$, while the FIG. 7C spectrum of Si is consistent with the silicon being in a flexible tetrahedral net. $^{29}Si$ could not be detected by normal NMR, suggesting that the Si is immobilized on the NMR timescale and consequently too broad to be seen without magic angle spinning The rubbery SiPOly formed as described with respect to FIG. 5 contains very little free water, because heating at 300° C. is accompanied by a mass loss of only 10 wt %—and the weight of the dry (now crystalline, but hygroscopic) powdery material remains almost unchanged when the temperature is raised to 600° C. As an additional measure of its stability, the rubbery SiPOly is quite stable up to 150° C. It has a yellowish color, and is translucent.

Figure 8:
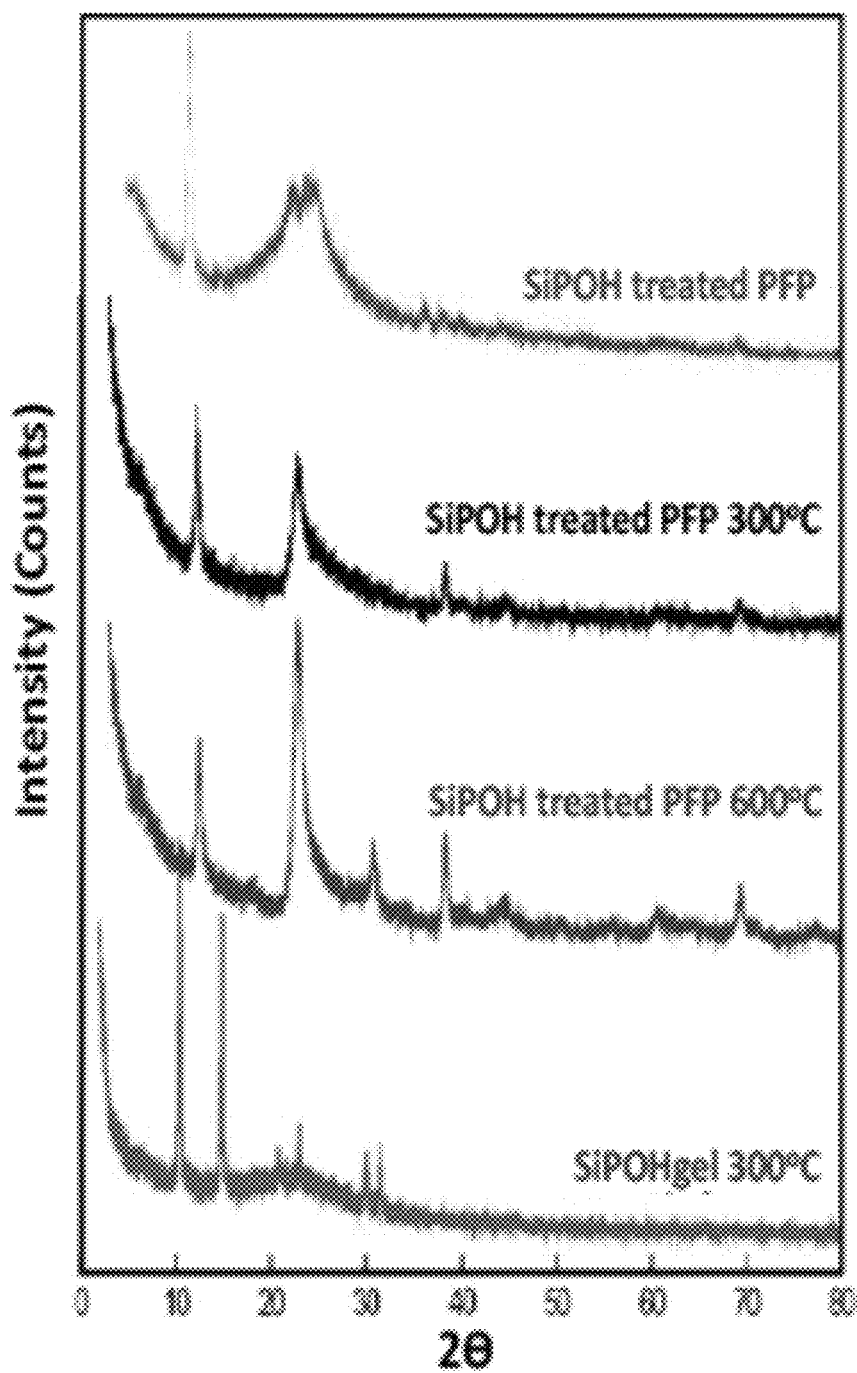
FIG. 8 shows X-ray powder patterns of calcined SiPOH and SiPOly.

FIG. 8 shows the X-ray powder patterns obtained for the product SiPOly after heating at 300° C. (bottom trace), during which a weight loss of 10 wt % occurs, as well as calcination products (300° C. and 600° C., middle traces) of SiPOH washed with pentafluoropentanol (PFP) to remove liquid phase components. The bottom trace is distinct from any of those obtained for SiPOH after treatments to remove any remaining liquid material by washing in perfluoropentanol (PFP). The difference is observed in the splitting of the SiPOH peak at 2θ=13°, and the virtual absence of a strong line at 2θ=23°. Without being bound by any theory, the weight loss during the calcination of SiPOly to give the XRD of FIG. 8, (bottom trace), is thought to be associated with the same process that reduces the conductivity above 150° C. The weight loss may correspond to the loss of a mole of water per mole of gel. Alternatively, the weight loss may correspond to the loss of a mole of water per mole of phosphorus and the reincorporation of the pyrophosphoric acid into complex silicophosphate structures. The top trace is the XRD of SiPOH washed free of excess $H_3PO_4$ and $H_4P_2O_7$ using PFP. The sharp peak (2θ=10°), with otherwise amorphous features in the XRD, is typical of an orientationally disordered phase.

Figure 9:
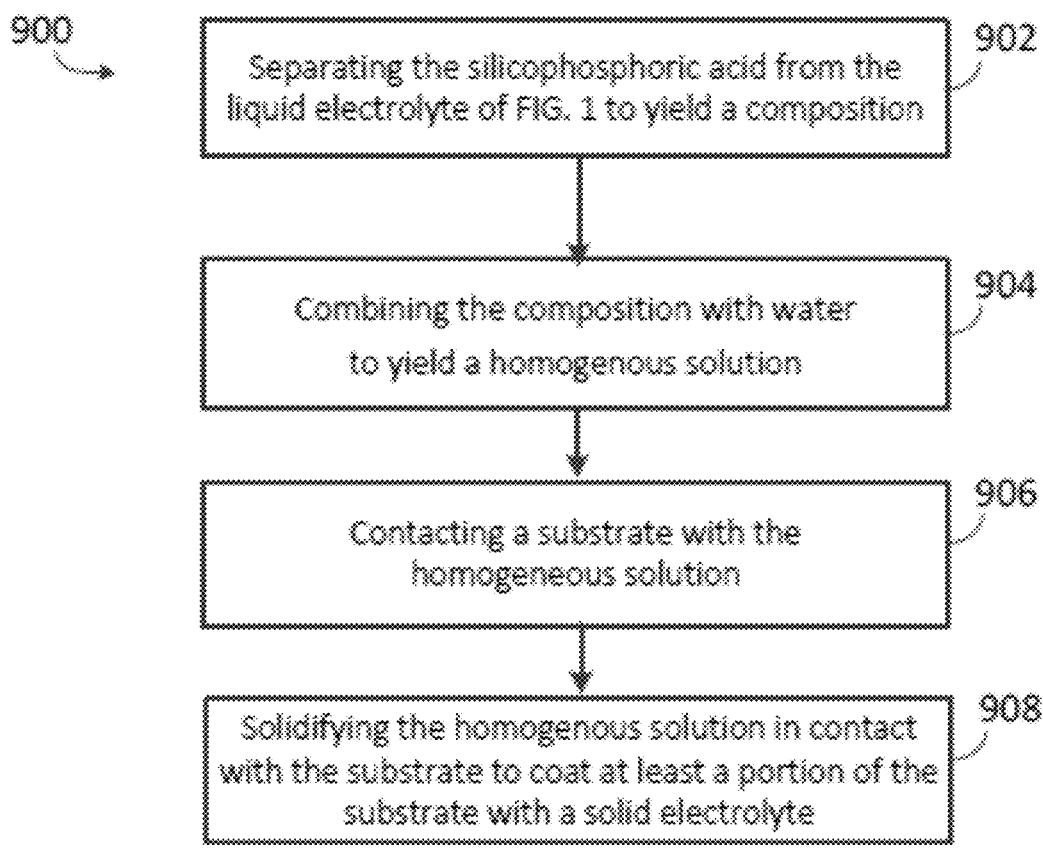
FIG. 9 shows a process for coating a substrate with SiPOly.

SiPOly may also be formed on a substrate to coat the substrate or at least a portion of the substrate with solid electrolyte. The substrate may be solid or porous. A porous substrate includes, for example, a matrix, a mesh, a porous paper, a porous polymer, and the like. The substrate may be flexible or rigid. Suitable substrates include, for example, a glass wool mesh and a metal screen. FIG. 9 shows process 900 for forming a substrate coated with a solid electrolyte. In 902, liquid is removed from the liquid electrolyte formed as described in FIG. 1 to yield a concentrated SiPOH composition. The composition includes SiPOH in the form of paste. Removing liquid from the suspension is described with respect to 502 in FIG. 5. In 904, the composition is combined with water to yield a homogenous solution, as described with respect to 504 in FIG. 5. In 906, a substrate is contacted with the homogenous solution. Contacting the substrate with the homogenous solution includes, for example, positioning the substrate in the homogenous solution, dipping the substrate in the homogenous solution, spraying the substrate with the homogenous solution, or the like.

In 908, homogeneous solution is solidified to coat at least a portion of the substrate with a solid electrolyte derived from SiPOH (SiPOly). Depending on the porosity of the substrate, the substrate may also be impregnated with SiPOly. When coated on a substrate, the SiPOly is a yellowish, translucent, deformable polymeric solid that is proton conductive and stable up to 140° C. at 1 atm, and, above 60° C., has conductivity in excess of that of pressurized NAFION as described herein. In some embodiments, the deformable polymeric solid is stable up to 150° C. When the substrate is a mesh, the mesh provides mechanical support to the SiPOly. A mesh or other porous substrate coated with SiPOly may be used as a proton conductive membrane.

Through process 900, SiPOly can be coated on or impregnated in a substrate (or both) without low temperature aqueous processing, thereby avoiding chemical modification of the electrolyte. The acidic nature of the solid electrolyte improves adherence to certain substrates, such as polybenzimidazole membranes. This improved coupling is thought to be due at least in part to proton transfer energy to the basic moieties in the substrate.

In another implementation of the process shown in FIG. 9, 2.8 g of water is added to 1.2 g of SiPOH, which dissolves completely. A quartz membrane (Cole Parmer QR-200 Tokyo Roshi Kaisha Ltd), initially 1.5 mm thickness, is added to the solution as the substrate for the gel. After vacuum drying at 40° C. for 15 h, and room temperature vacuum drying for another 9 h, a colorless, transparent, soft gel is formed. The total weight loss is 66%, corresponding to a 95% loss of water.

The fuel cell performance using the SiPOH-containing phosphoric acid liquid electrolyte was studied in the same TEFLON sandwich cell with E-TEK electrodes used in the study by Belieres et al., "Binary inorganic ionic salt mixtures as high conductivity electrolytes for >100° C. fuel cells," Chem. Commun. (Cambridge) 4799 (2006), which is incorporated by reference herein, and also depicted in FIG. 10.

Figure 10:
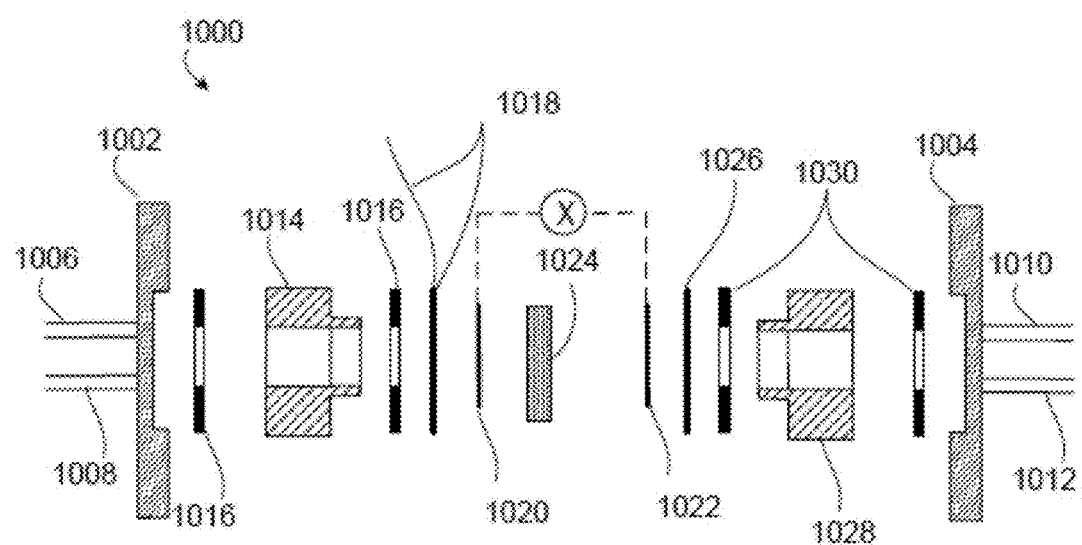
FIG. 10 is an exploded view of a fuel cell.

FIG. 10 is an exploded view of a TEFLON sandwich type fuel cell 1000 used for fuel cell testing with liquid and solid electrolytes described herein. Fuel cell 1000 includes end caps 1002 and 1004. End cap 1002 has conduits 1006 and 1008 for use as an inlet and outlet, respectively. End cap 1004 has conduits 1010 and 1012 for use as an inlet and outlet, respectively. In one embodiment, fuel is provided as hydrogen entering through conduit 1006. The hydrogen flows through TEFLON spacer 1014, positioned between gaskets 1016, and contacts anode catalyst 1018. Anode catalyst 1018 may be, for example, a platinum mesh coupled to a platinum wire. Anode catalyst 1018 breaks down the hydrogen into electrons and hydrogen ions. The electrons flow from anode 1020 to cathode 1022 via a load. The hydrogen ions flow from anode 1020 through electrolyte 1024 past cathode 1022 to cathode catalyst 1026. With an oxygen-containing gas flowing into fuel cell 1000 via conduit 1010 in end cap 1004, cathode catalyst 1026 converts the hydrogen ions to "waste" chemicals, such as water, that flow through TEFLON spacer 1028 between gaskets 1030 and exit via conduit 1012, along with unused gas that enters via conduit 1010. Excess fuel flows out of fuel cell 1000 via outlet 1008 in end cap 1002.

Anode 1020 and cathode 1026 may be, for example, E-TEK carbon-Pt electrodes. Electrolyte 1024 may be a liquid such as that described with respect to FIG. 1, a solid electrolyte such as that described with respect to FIG. 5 ("pristine SiPOly"), or a substrate (e.g., mesh) coated at least partially with a solid electrolyte, such as that described with respect to FIG. 9. The liquid electrolyte is held in the cavity formed by TEFLON spacers, with fuel cell 1000 secured via end caps 1002 and 1004. The pristine SiPOly and coated substrate are held between electrodes 1020 and 1022 and secured via end caps 1002 and 1004.

Figure 11:
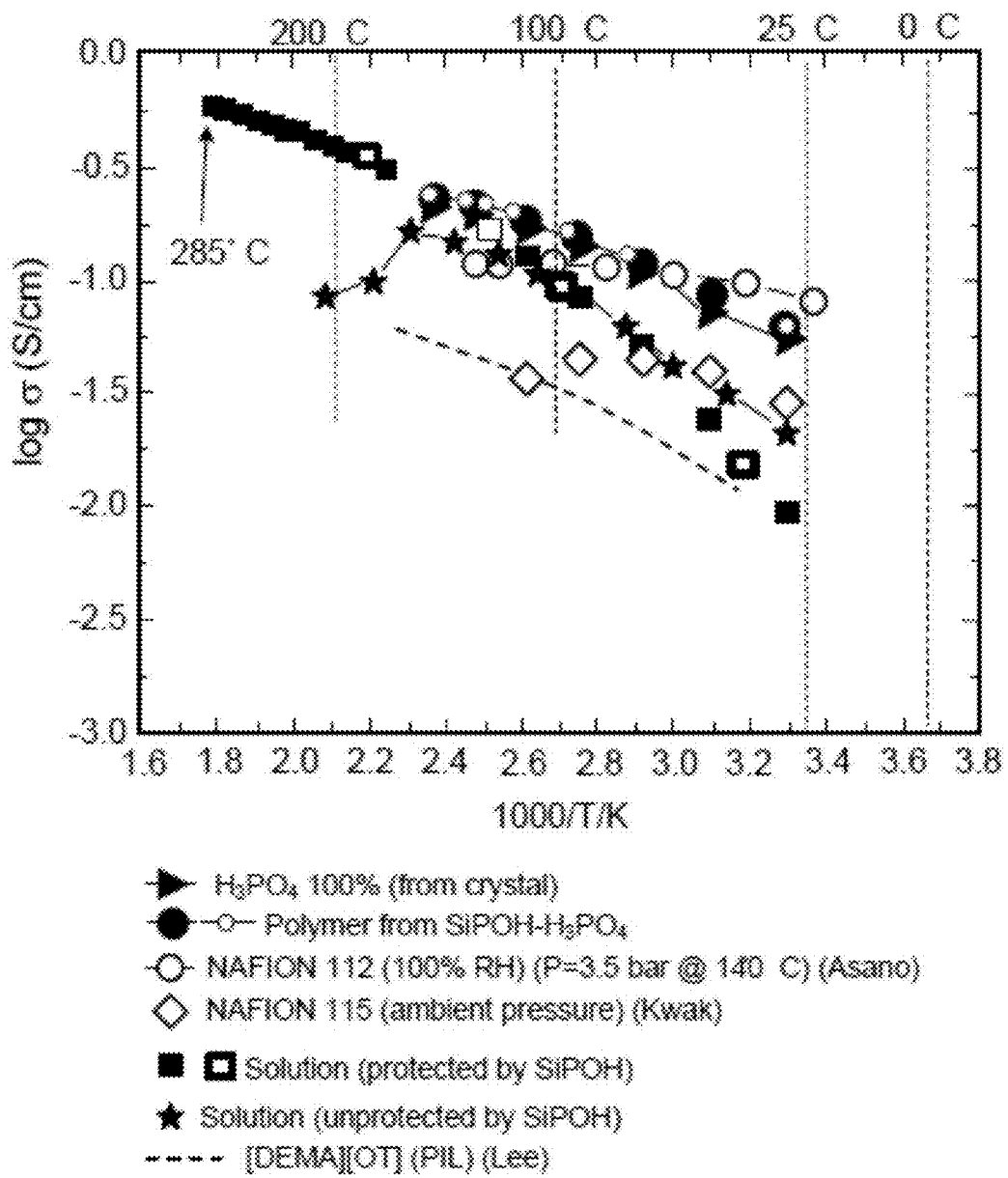
FIG. 11 shows ionic conductivities of SiPOH-stabilized electrolytes and other fuel cell electrolytes.

FIG. 11 shows ionic conductivities of SiPOH-stabilized electrolytes, as measured in the TEFLON sandwich fuel cell depicted in FIG. 10, compared with various fuel cell electrolytes, including NAFION. Data from the present disclosure are in solid symbols for heating runs and smaller open symbols for cooling runs, to show reproducibility. Star symbols show the conductivity of the liquid electrolyte described herein after centrifuging to remove solid matter including SiPOH acid from the suspension. Only the heating data are shown. It is seen that without SiPOH protection the conductivity fails above 150° C. The conductivity of the protic ionic liquid diethylmethylammonium triflate [DEMA$^+$][OTf] (Nakamoto et al., Chem. Commun. (2007) 2539, which is incorporated herein by reference), used in a recent fuel cell membrane (Lee et al., J. Power Sources 195 (2010) 5909, and Lee et al., J. Am. Chem. Soc. 132 (2010) 9764, both of which are incorporated by reference herein) is shown as a dashed line for comparison. Comparison is made with anhydrous $H_3PO_4$, NAFION (Asano et al., J. Am. Chem. Soc., 128 (2006) 1762; and Kwak et al., Solid State Ionics, 160 (2003) 309, both of which are incorporated by reference herein) and with SiPOly. Even at 25° C., the conductivity is comparable to that observed for DEMA triflate, a commonly used ambient temperature protic ionic liquid fuel cell electrolyte.

Above 150° C. the electrolyte conductivity, determined using a twin electrode dip-type cell of cell constant 1.83 cm$^{-1}$, is superior to that of pure $H_3PO_4$. This is thought to be due to a superior "free" proton contribution at high temperatures. The conductivity is reversible up to 285° C. Tested at a constant 250° C., the conductivity remained invariant within the temperature control fluctuations over a 24 hour period, and over a 48 hr period at 230° C., so loss of water has been greatly diminished. In an operating fuel cell (producing water), the minor loss of water observed in the static experiment is not expected to significantly impact results.

Figure 12:
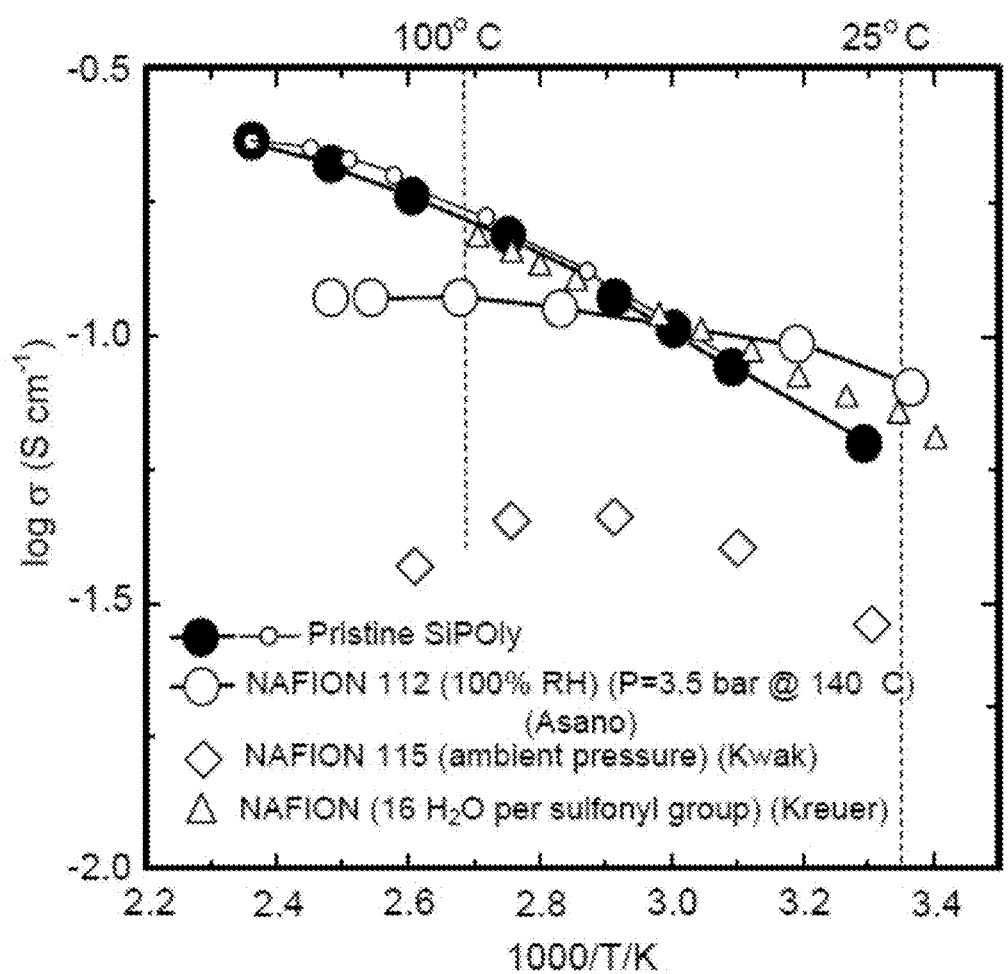
FIG. 12 shows the conductivity of SiPOly at temperatures up to 150° C. compared with those of NAFION samples from different references.

FIG. 12 shows the conductivity, measured on a circular sample cut from SiPOly formed as described in FIG. 5 ("pristine SiPOly). The conductivity was measured by means of a piston type cell with stainless steel electrodes and mild spring compression for good electrode contact. Comparison is made with data from three separate references (Kreuer, J. Membrane Sci. 185 (2001) 29; Asano et al., J. Am. Chem. Soc., 128 (2006) 1762; and Kwak et al., Solid State Ionics, 160 (2003) 309, all of which are incorporated by reference herein) on NAFION membranes measured under different conditions of hydration and pressure. The stability of the present sample at temperatures up to 150° C. is shown by the agreement of data obtained during cooling with data obtained during heating, with solid symbols for heating runs and smaller open symbols for cooling runs. SiPOly conductivity is seen to exceed the conductivity of all other samples at any temperature above 60° C.

An advantage of the pristine SiPOly membrane is the low water content, which permits it to operate at much higher temperatures. In contrast, the specific conductivity of NAFION is strongly influenced by the number of water molecules surrounding the sulfonyl group. As is well known, water is transported across the membrane during operation, causing flooding. Consequently water-management becomes a crucial problem. The low water content and the higher operating temperature permitted with the pristine SiPOly membrane avoids this difficulty.

Figure 13:
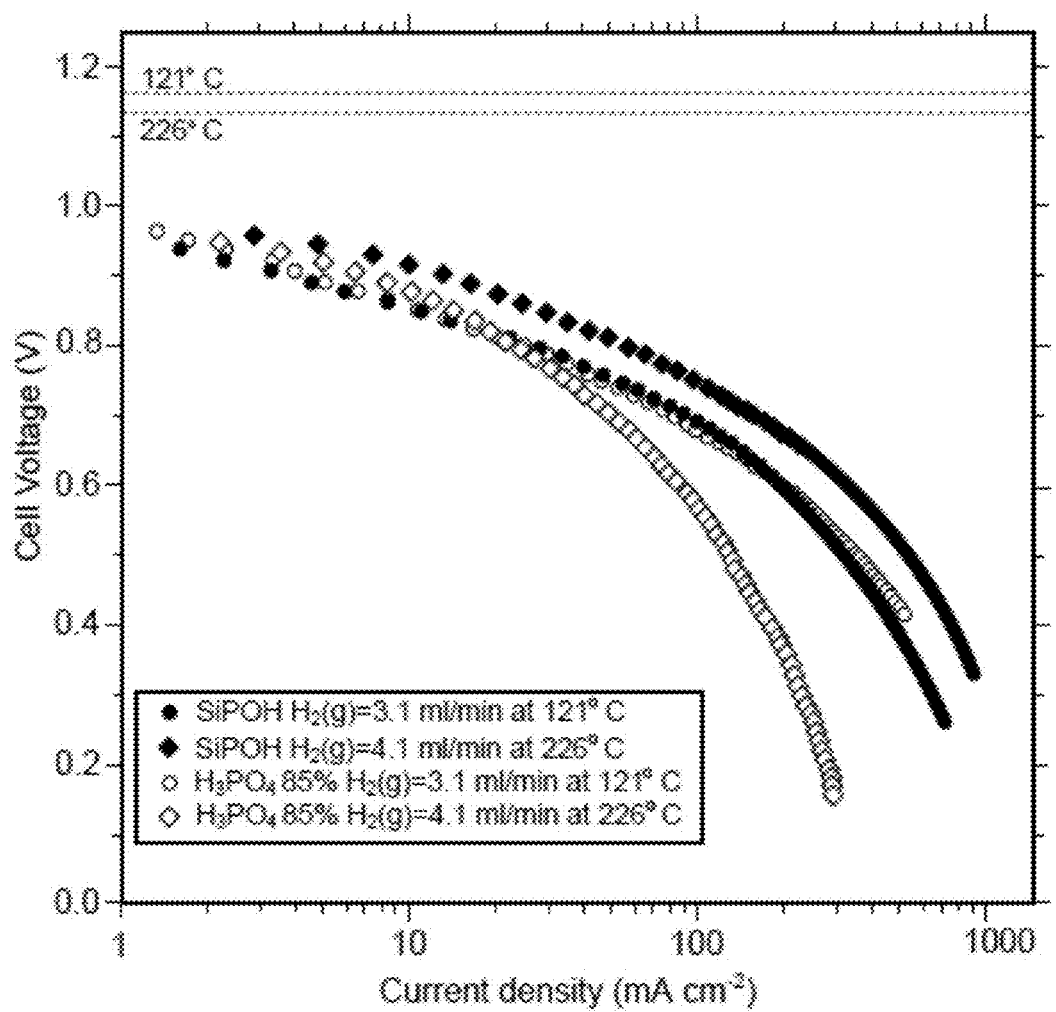
FIG. 13 shows Tafel plots (IR corrected) for fuel cell performance, using SiPOH-stabilized phosphoric acid, compared with performance using the commercial standard, $H_3PO_4$ 85%.

FIG. 13 shows Tafel plots (IR corrected) for fuel cell performance, using the SiPOH-stabilized phosphoric acid, compared with performance using the commercial standard, $H_3PO_4$, 85%. The experiments used the Teflon fuel cell depicted in FIG. 10, with E-Tek gas diffusion electrodes, and the same flow rates of $H_2$ and $O_2$ for each electrolyte at each temperature (see Table 1). Flow rate for $O_2$=2× flow rate for $H_2$. Note the high OCV, and ~1 amp cm$^{-2}$ current, obtained at 226° C. The system operates smoothly at temperatures as high as 226° C. Using unhumidified gases, currents of 1 amp/cm$^2$ have been drawn, with open circuit voltages (OCV) of nearly 1.0 volt. This OCV is only 0.12 V below the thermodynamic value for that temperature, and is somewhat higher than that obtained with the standard 85wt % phosphoric acid electrolyte (also shown in FIG. 13).

Again, the SiPOH-stabilized electrolyte yields favorable numbers relative to other cells for which the data are available.

FIG. 13 shows total polarization curves for the SiPOH-stabilized phosphoric acid liquid electrolyte, in Tafel plot form, using the usual flow rate ratio (oxygen three times faster than hydrogen). Comparison is made with corresponding curves for the standard 85% phosphoric acid electrolyte typically used in commercial phosphoric acid fuel cells at 125° C. using the higher flow rates needed to maximize the current. As shown in FIG. 13, the cell having the SiPOH-stabilized phosphoric acid liquid electrolyte operated

TABLE 1

Fuel cell performance conditions and metrics.

| | Operating Temp ° C. | $H_2$ flow rate (ml/min) | Max. Current dens (mA cm$^{-2}$) | Current dens $P_{max}$ (mA cm$^{-2}$) | Current Effic % | Current Effic % at $P_{max}$ | Voltage Effic % (OCV) | Voltage Effic % at $P_{max}$ | Reference |
|---|---|---|---|---|---|---|---|---|---|
| Nafion 115 | 30.0 | 20.0 | 660.0 | 540.4 | 25.1 | 20.6 | 73.1 | 34.9 | (a) |
| Nafion 117-polypropylene-composite (70:30 weight ratio) | 22.0 | 100.0 | 700.0 | — | 5.3 | — | 57.2 | — | (b) |
| Nafion/inorganic composit membrane RH = 50% | 120.0 | >270 | 580.0 | 433.6 | 1.7 | 1.2 | 81.8 | 35.8 | (c) |
| Pristine Nafion membrane | 60.0 | 300.0 | 1800.0 | 1208.5 | 4.6 | 3.1 | 79.4 | 39.8 | (d) |
| Molten carbonate fuel cell (fluidized bed electrode) | 650.0 | 10 ($O_2$) | 115.6 | — | 8.8 | — | 29.1 | — | (e) |
| [dema][TiO] in | 30.0 | 120.0 | — | 450.0 | — | 2.9 | 67.8 | 29.3 | (f) |
| Sulfonated | 120.0 | 12.0 | — | 190.0 | — | 12.1 | 64.6 | 28.2 | (f) |
| Polyimide | 140.0 | 12.0 | — | 50.0 | — | 3.1 | 59.7 | 35.7 | (f) |
| Phosphoric acid 85% (cell area 0.5 cm$^2$) | 121.0 | 3.1 | 622.0 | 299.0 | 76.3 | 36.4 | 88.7 | 30.7 | This work |
| | 226.0 | 4.1 | 303.0 | 115.0 | 28.0 | 14.4 | 85.7 | 32.9 | This work |
| SIPOH (cell area 0.6 cm$^2$) | 121.0 | 3.1 | 731.0 | 345.0 | 89.7 | 38.4 | 85.4 | 33.0 | This work |
| | 226.0 | 4.1 | 966.0 | 477.0 | 89.6 | 44.3 | 85.4 | 33.8 | This work |

All results are given based on 1 bar pressure and cell area of 1 cm$^2$
(a) A. Mota, P. P. Lopes, E. A. Ticianelli, E. R. Gonzalez, and H. Varela, Journal of The Electrochemical Society. 157(9) B1301-B1304
(b) Sabit Adanur et al., NTC Project. F04-AE01, National Textile Center Annual Report: November 2006.
(c) C. Wang, E. Chalkova, J. L. Lee, M. V. Fedkin, S. Komameni, and S. N. Lvov, J. Electrochem. Soc., 158(6) B690-B697 (2011).
(d) W. Zhao, T. Haolin, n, Z. Huijie, L. Ming, nn, C. Rui, X. Pan, P. Mu, J. Membrane Sci. 421-422, 201-210 (2012).
(e) J. Zhang, Z. Zhong, J. Xiao, Z. Fu, J. Zhao, W. Li, and M. Yang, Korean J. Chem. Eng. 28(8), 1773-1778 (2011).
(f) S.-Y. Lee, A. Ogawa, M. Kanno, H. Nakamoto, T. Yasuda, and M. Watanabe, J. AM. CHEM. SOC. 132 (2010) 9764-9773.

Figure 14:
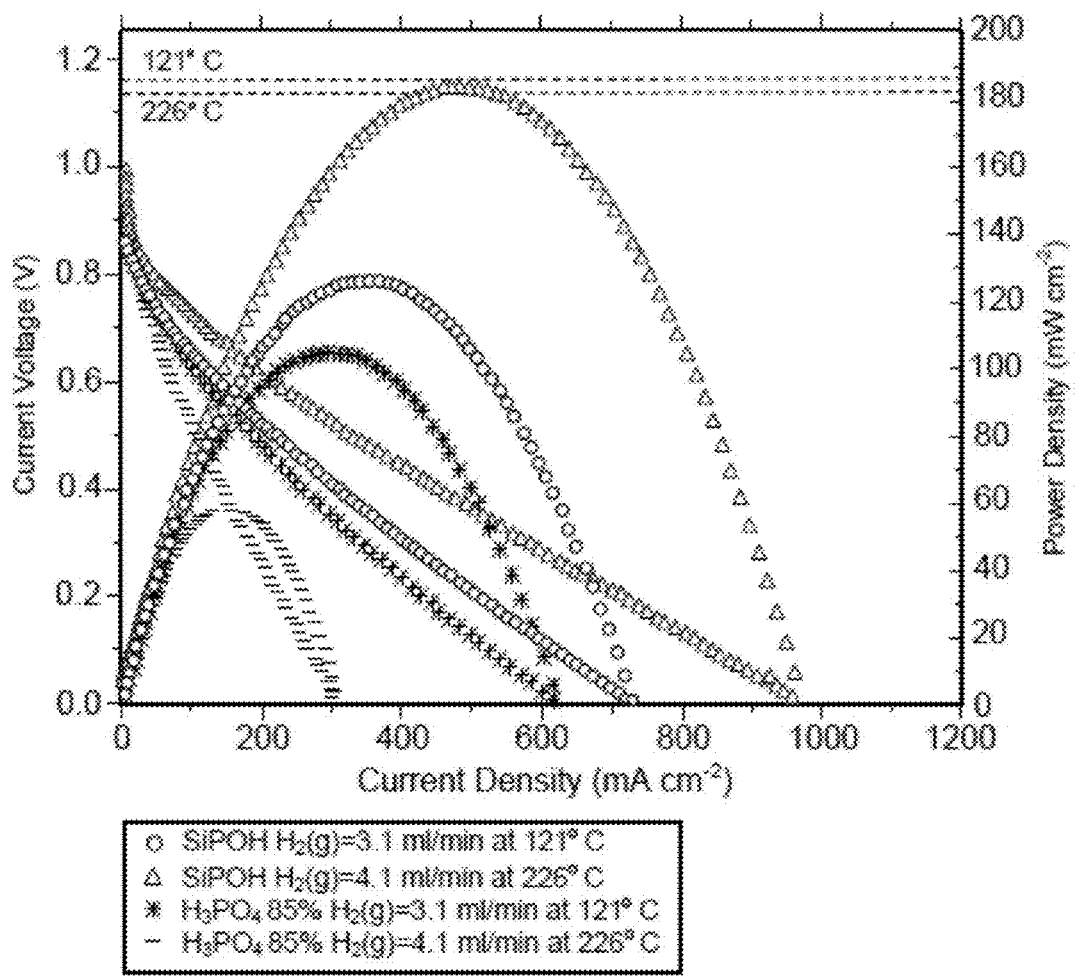
FIG. 14 shows polarization curves (linear current and no IR correction), and the corresponding power densities, for SiPOH-stabilized anhydrous $H_3PO_4$ and $H_3PO_4$ (85 wt %) electrolytes at different temperatures up to 226° C.

FIG. 14 shows polarization curves (linear current and no IR correction), and the corresponding power densities, for SiPOH-stabilized anhydrous $H_3PO_4$, and $H_3PO_4$ (85 wt %), electrolytes at different temperatures up to 226° C. The power outputs for the SiPOH-stabilized electrolyte at the two temperatures of FIG. 13 are shown in FIG. 14. The currents, both at (i) maximum power and (ii) where cell voltage vanishes in the uncorrected polarization curve, are shown, along with open circuit voltage, voltage at maximum power, and other performance characteristics, in Table 1.

One aspect of the fuel cell performance with the present electrolyte is the fuel usage efficiency, monitored by the hydrogen flow rate at maximum current. Table 1 lists the current efficiency (defined as (½ the moles $H_2$ supplied per sec)/(Faradays of electricity flowing per sec)), both at the peak power condition. A second value based on the current flowing when the cell voltage (without IR correction) vanishes, is sometimes made, and may approach 100%, but the first metric is believed to be more relevant.

The voltage efficiency is also presented in Table 1, using two alternative definitions. The first is [OCV/theoretical emf]×100 at the temperature of measurement, while the second is that based on the voltage at the power maximum.

smoothly at temperatures as high as 227° C., and drew currents up to 1 amp/cm$^2$ with open circuit voltages (OCV) of nearly 1.0 volt. This OCV is only 0.12 V below the thermodynamic value for that temperature, and is higher than that obtained with the standard 85% phosphoric acid electrolyte, also shown in FIG. 13.

Fuel efficiency is an especially notable aspect of the fuel cell performance with the SiPOH-stabilized phosphoric acid liquid. That is, while other fuel cell studies report maximum current output with hydrogen flow rates of 20-30 ml/min per cm$^2$ of electrode area, maximum currents were obtained in this work with much smaller flow rates. Except for the highest temperatures where the full 25 ml/min was needed, fuel flow rates needed to maintain the maximum current were small (e.g., 10 ml/min at 120° C. corresponding to almost 100% current efficiency). Table 1 lists efficiencies of the fuel cell described herein and includes comparisons with reported values as noted. The higher efficiencies are presumably linked to the same advantageous kinetics that lead to very short recovery times. The recovery time is the time taken to recover the open circuit voltage after fuel flow has stopped and is typically on the order of 10-30 min. However, with SiPOH electrolytes the recovery time is in some cases too short to measure properly—typically on the order of seconds. This feature can be especially advantageous in fuel cell implementations.

temperature are included in legends. Flow rate for $O_2 = 2 \times$ flow rate for $H_2$. The dotted lines at the top of the diagram are the thermodynamic OCV's for the temperatures indi-

TABLE 2

Figure 15:
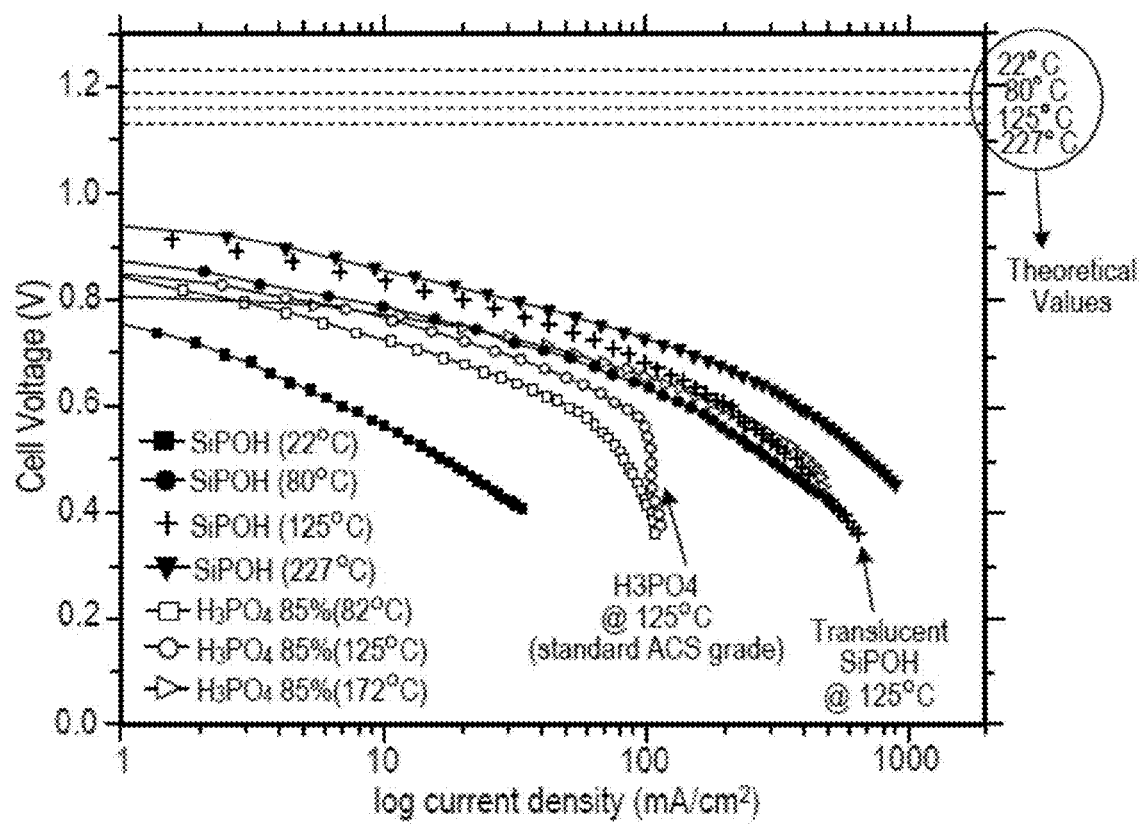
FIG. 15 shows polarization curves for $H_2/O_2$ fuel cells having a SiPOH-stabilized $H_3PO_4$ liquid electrolyte and a standard $H_3PO_4$ electrolyte.
Figure 16:
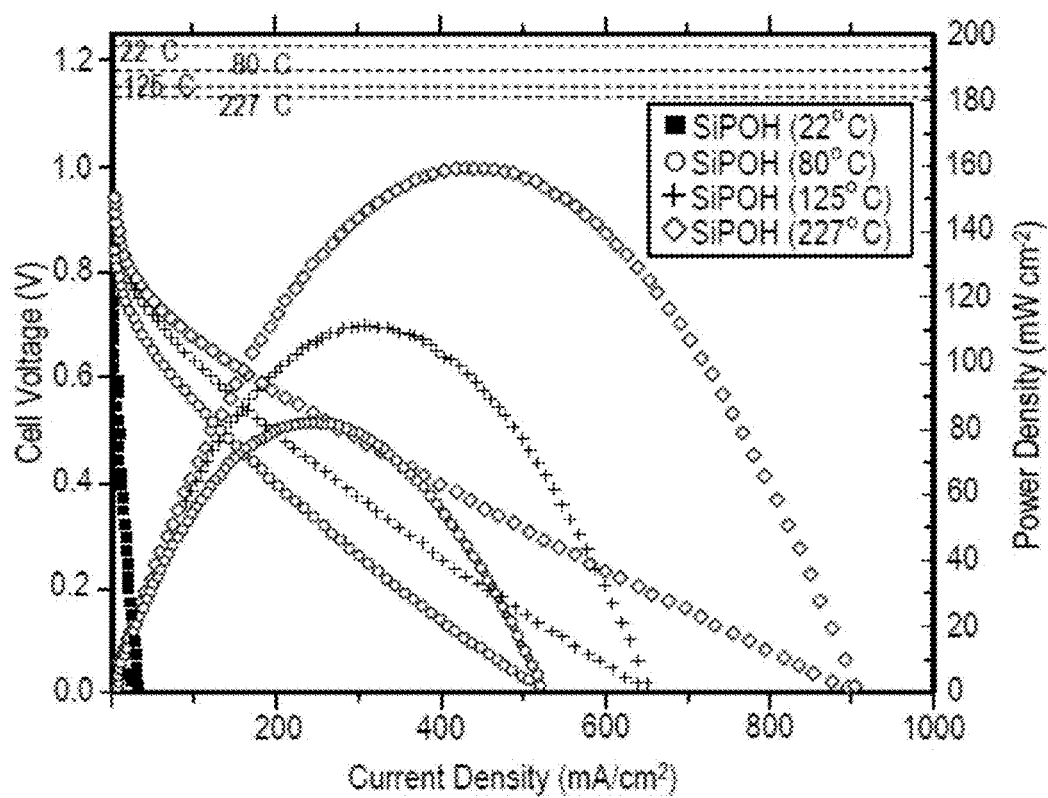
FIG. 16 shows polarization curves including power density for $H_2/O_2$ fuel cells having a SiPOH-stabilized $H_3PO_4$ liquid electrolyte.

Fuel cell efficiencies.
The data shown in FIGS. 15 and 16 have been obtained with fuel cells utilizing liquid

|  | $H_2$ flow rate (ml/min) | Max. Current density (mA cm$^{-2}$) | Operating Temp ° C. | Current Efficiency % | Voltage Efficiency % | Reference |
|---|---|---|---|---|---|---|
| Nafion 115 | 20 | 660 | 30 | 25.5 | 73.11 | (a) |
| Nafion 117/polypropylene composite (70:30 weight ratio) | 100 | 700 | 22 | 5.3 | 57.19 | (b) |
| Molten carbonate fuel cell (fluidized bed electrode) | 10 ($O_2$) | 115.56 | 650 | 27.2 | 29.13 | (c) |
| Nafion/inorganic composit membrane RH = 20% | >270 | 580 | 120 | 2.1 | 81.63 | (d) |
| SiPO | 0.4 | 36 | 25 | 68.42 | 60.98 | This work |
| SiPO | 12.8 | 902 | 227 | 89.6 | 82.03 | This work |

All results are given based on 1 bar pressure
(a) A. Mota, P. P. Lopes, E. A. Ticianelli, E. R. Gonzalez, and H. Varela. Journal of The Electrochemical Society. 157(9) B1301-B1304 (2010)
(b) Sabit Adanur et al., NTC Project: F04-AE01, National Textile Center Annual Report. November 2006.
(c) Jubing Zhang, Zhaoping Zhongt, Jianmin Xiao, Zongming Fu, Jinxiao Zhao, Weiling Li, and Min Yang. Korean J. Chem. Eng. 28 (8) 1773-1778 (2011)
(d) Chunmei Wang, Elena Chalkova, Jeong K. Lee, Mark V. Fedkin Sridhar Komameni, and Sergyeu N. Lvov. J. Electrochem Soc. 158 (B) B690-B697 (2011).

electrolytes. In most fuel cell applications, the liquid electrolytes need to be incorporated in a polymer membrane of some sort to avoid problems with "ionic shorts" caused by leaked liquid electrolytes. A polymer typically used in phosphoric acid type fuel cells is polybenzimidazole (PBI), the imide nitrogen of which undergoes strong hydrogen bonding to $H_3PO_4$, with partial proton transfer, which helps retain the electrolyte in the membrane. The conductivity of optimized forms of this membrane is reported to be as high as 100 mS/cm at ambient temperature. As described herein, PBI membranes have been prepared in thin films, and SiPOH has been incorporated in the membranes by soaking them in aqueous solutions containing concentrated SiPOH—$H_3PO_4$. The SiPOH is thought to be preferentially incorporated due to its more acidic protons. The conductivity of the membranes so formed is found to be about 8 mS/cm at 30° C.

Figure 17:
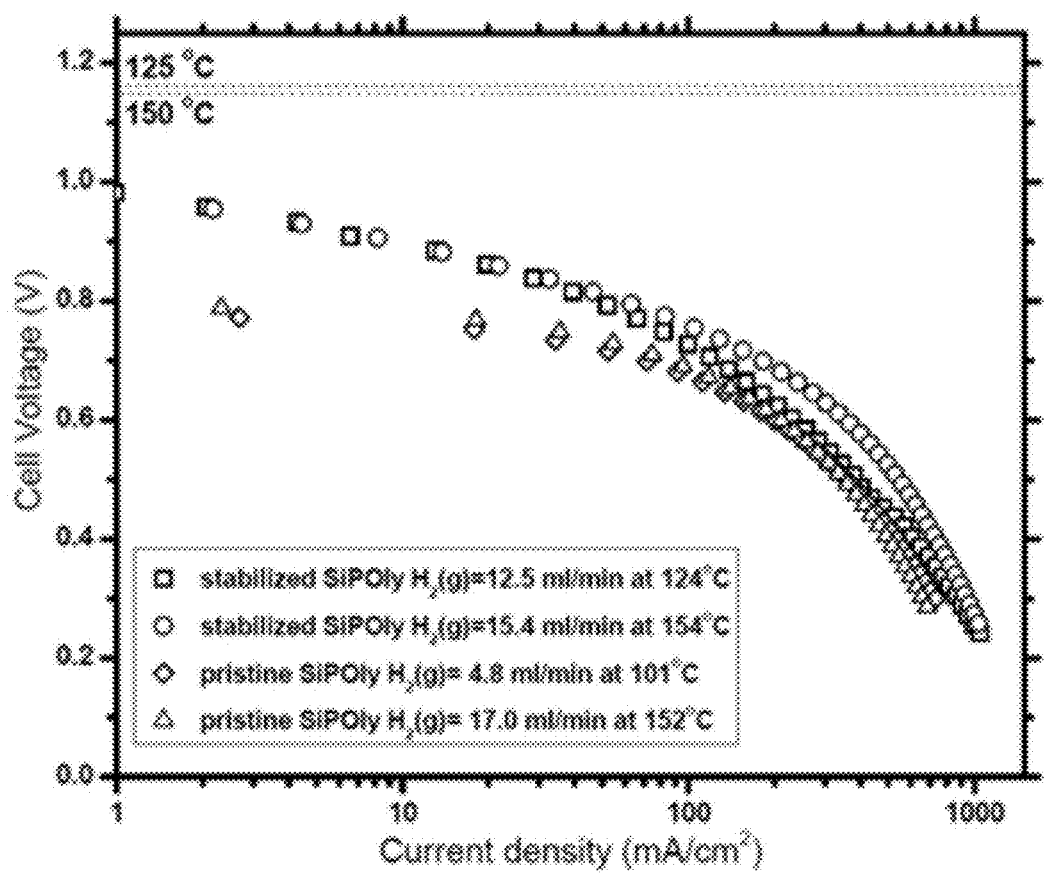
FIG. 17 shows Tafel plots (IR corrected) for fuel cell performance using SiPOly membranes and SiPOly coated membranes.
Figure 18:
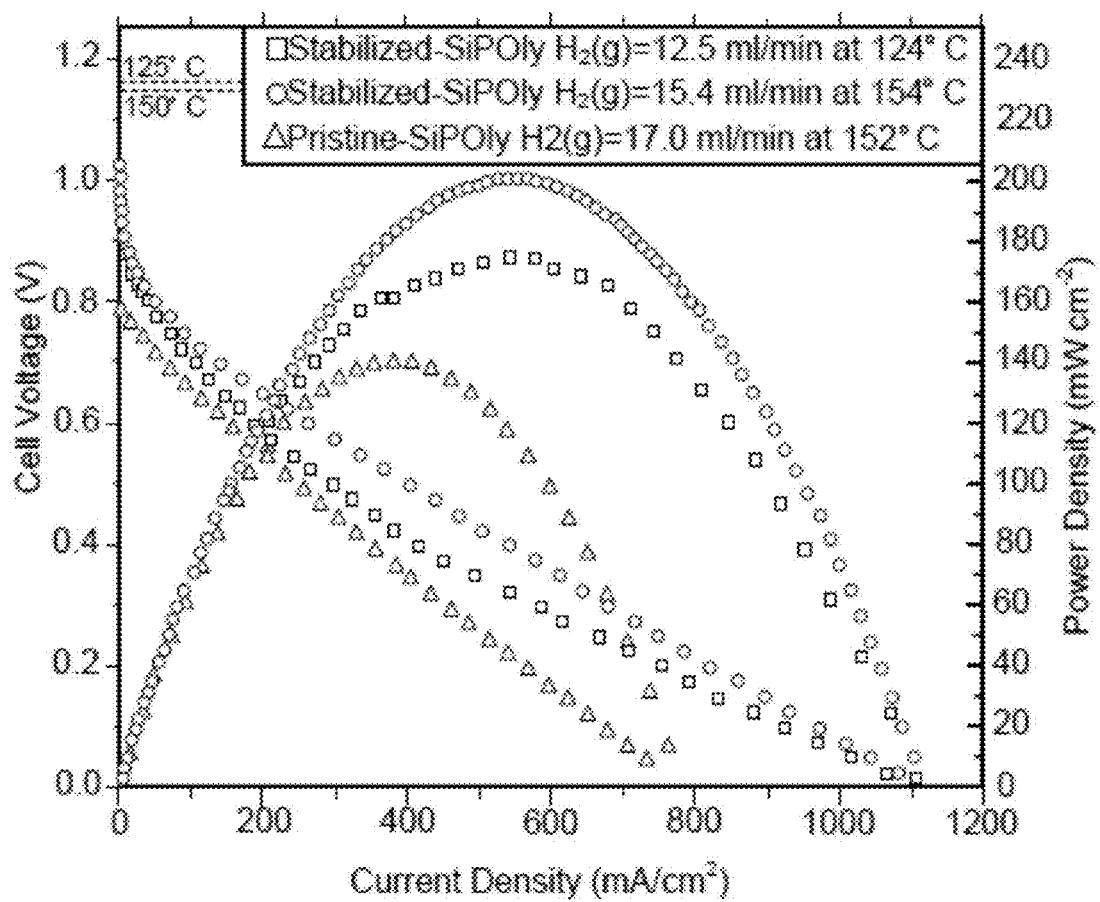
FIG. 18 shows polarization curves (linear current and no IR correction) using SiPOly membranes and SiPOly coated membranes.

The data shown in FIGS. 17 and 18 were obtained with fuel cells having a proton conductive membrane based on the rubbery solid electrolyte formed as described with respect to FIGS. 5 and 9. In forming the SiPOly coated membrane, a fiberglass wool filter membrane ((Cole-Palmer item QR-200 (Toyo Roshi Kaisha Ltd, Japan) ~2 mm thick initially) was coated with SiPOly as described with respect to FIG. 9. This membrane was placed in cell 1000 depicted in FIG. 10 between two standard E-Tek electrodes (LT140E-W; 0.5 mgPt/cm$^2$). To achieve a better contact between the electrode and the electrolyte, the assembled cell was left in a dessicator overnight prior to testing. During the testing, the cell was left 2-3 hours at each temperature to ensure thermal equilibrium. The temperature of the cell was tracked relative to the oven atmosphere temperature during the test, for any indication of direct burning by fuel crossover.

Polarization curves obtained using the improved membrane electrode assembly are shown in FIGS. 17 and 18. FIG. 17 shows Tafel plots (IR corrected) for fuel cell performance using the pristine SiPOly (formed as described with respect to FIG. 5) lower curves with poor OCV) and the fiberglass-reinforced and dimensionally regular "stabilized" SiPOly coated membrane, (formed as described with respect to FIG. 9). The experiments used identical TEFLON fuel cell blocks with identical E-Tek electrodes, as show in FIG. 10. Different gaskets allowed for active areas of 0.5 cm$^2$ and 0.8 cm$^2$. Flow rates of $H_2$ for each electrolyte at each cated. The OCV has values similar to those obtained with the liquid electrolyte cell, and the maximum current now slightly exceeds 1000 mAcm$^{-2}$.

FIG. 18 shows polarization curves (linear current and no IR correction), and the corresponding power densities, for the pristine SiPOly membrane (at 152° C.) and the fiberglass reinforced SiPOly coated membrane (at 124° C. and 154° C.). Note the power maximum of 202 mWcm$^{-2}$ obtained at 0.4 V for the fiberglass-reinforced membrane at 154° C. The power output at maximum power is 200 mWcm$^{-2}$.

Figure 20:
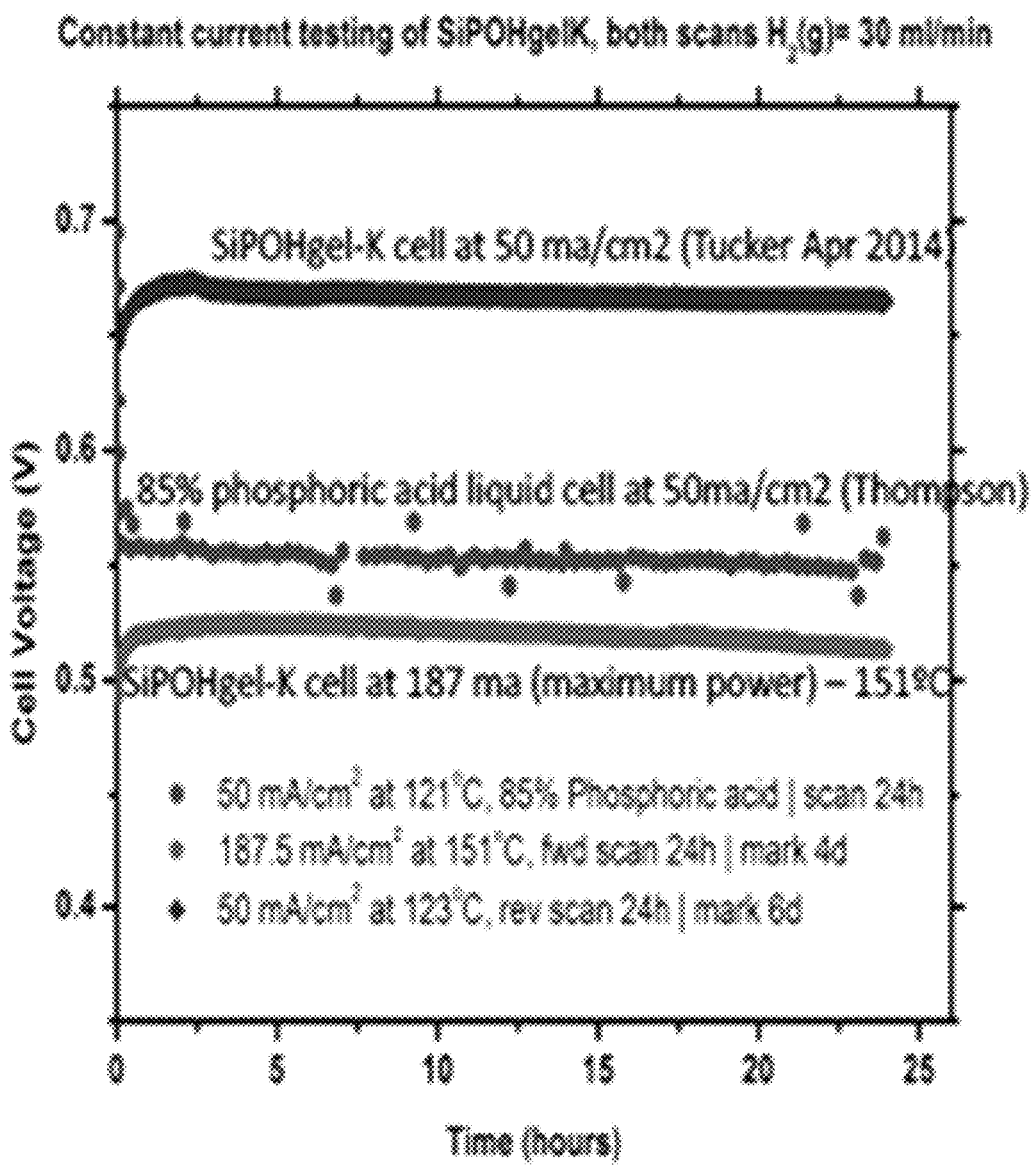
FIG. 20 shows results of constant current tests (endurance tests) over 24 hours.

FIG. 20 shows results of constant current tests (endurance tests) over a 24 hour duration (Parstat 2273 Advanced Electrochemical System) at current densities of 50 mAcm$^{-2}$ at 120° C. The results were compared to an earlier study (see e.g., Thompson, 2011, *Ph.D. Thesis*, Arizona State University) using the same cell and same electrodes, but with 85% phosphoric acid (liquid) as the electrolyte. The SiPOH-gel was prepared using the "closed system" synthesis as described herein. The potential at 50 mAcm$^{-2}$ exceeded of the results of the earlier study by 20%, and remained relatively constant over the entire run. A further and more severe test was conducted at 151° C. at the current of maximum power, 187 mAcm$^{-2}$. In this test, a noticeable downward drift was detected after about 12 hours, which amounts to about 1-2 mV (2-4%) over the 24 hour period.

A number of embodiments of the invention have been described. Nevertheless, it will be understood that various modifications may be made without departing from the spirit and scope of the invention. Accordingly, other embodiments are within the scope of the following claims. Further modifications and alternative embodiments of various aspects will be apparent to those skilled in the art in view of this description. Accordingly, this description is to be construed as illustrative only. It is to be understood that the forms shown and described herein are to be taken as examples of embodiments. Elements and materials may be substituted for those illustrated and described herein, parts and processes may be reversed, and certain features may be utilized independently, all as would be apparent to one skilled in the art after having the benefit of this description. Changes may be made in the elements described herein without departing from the spirit and scope as described in the following claims. All cited patents, patent applications and references are incorporated by reference in their entireties for all purposes.

What is claimed is:

1. A solid electrolyte comprising:
   a silica network; and
   phosphoric acid,
   wherein the silica network is formed from a gel comprising a uniform distribution of the phosphoric acid, and the solid electrolyte is flexible.

2. The solid electrolyte of claim 1, wherein the phosphoric acid is within the silica network.

3. The solid electrolyte of claim 1, wherein the silica network is a tetrahedral network.

4. The solid electrolyte of claim 1, wherein the ratio of silicon to phosphorus in the solid electrolyte is about 1:4.

5. The solid electrolyte of claim 1, wherein the solid electrolyte is chemically stable up to 150° C.

6. The solid electrolyte of claim 1, wherein the conductivity of the solid electrolyte exceeds 200 mS/cm at 100° C.

7. The solid electrolyte of claim 6, wherein the conductivity of the solid electrolyte exceeds 300 mS/cm at 200° C.

8. The solid electrolyte of claim 1, wherein the solid electrolyte is elastically deformable.

9. A fuel cell comprising the solid electrolyte of claim 1.

10. A substrate comprising a solid electrolyte, wherein the solid electrolyte comprises:
    a silica network; and
    phosphoric acid,
    wherein the silica network is formed from a gel comprising a uniform distribution of the phosphoric acid, and the solid electrolyte is flexible.

11. The substrate of claim 10, wherein the substrate is porous.

12. The substrate of claim 10, wherein the substrate comprises a mesh, a matrix, a screen, a porous paper, or a porous polymer.

13. The substrate of claim 10, wherein the substrate is flexible.

14. The substrate of claim 10, wherein the substrate is coated with the solid electrolyte.

15. The substrate of claim 10, wherein the substrate is impregnated with the solid electrolyte.

16. The substrate of claim 10, wherein the substrate is a proton conductive membrane.

17. A method of preparing a solid electrolyte, the method comprising:
    reacting phosphoric acid in the liquid state with silicon tetrachloride to yield a fluid suspension;
    heating the fluid suspension to yield a liquid electrolyte comprising a particulate solid;
    separating the particulate solid from the liquid electrolyte;
    combining the particulate solid with water to yield a homogenous solution; and removing water from the homogenous solution to yield the solid electrolyte,
    wherein the solid electrolyte comprises:
    a silica network; and
    phosphoric acid,
    wherein the silica network is formed from a gel comprising a uniform distribution of the phosphoric acid, and the solid electrolyte is flexible.

18. The method of claim 17, further comprising contacting the homogenous solution with a substrate, wherein removing water from the homogeneous solution to yield the solid electrolyte coats at least a portion of the substrate with the solid electrolyte to yield a coated substrate.

19. The method of claim 18, wherein the coated substrate is proton conductive.

* * * * *